(12) United States Patent
Niziol

(10) Patent No.: US 11,489,225 B2
(45) Date of Patent: *Nov. 1, 2022

(54) SAFE TRANSPORT AND STORAGE OF ENERGY STORAGE DEVICES

(71) Applicant: DESIGN SCIENCE CORP., Pickering (CA)

(72) Inventor: Chester Stanley Niziol, Pickering (CA)

(73) Assignee: Design Science Technology LLC, Southlake, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/760,838

(22) PCT Filed: Sep. 23, 2019

(86) PCT No.: PCT/CA2019/051354
§ 371 (c)(1),
(2) Date: Apr. 30, 2020

(87) PCT Pub. No.: WO2020/056527
PCT Pub. Date: Mar. 26, 2020

(65) Prior Publication Data
US 2021/0057688 A1    Feb. 25, 2021

Related U.S. Application Data

(60) Provisional application No. 62/734,494, filed on Sep. 21, 2018.

(51) Int. Cl.
*H01M 50/20* (2021.01)
*H01M 50/24* (2021.01)
(Continued)

(52) U.S. Cl.
CPC ....... *H01M 50/20* (2021.01); *H01M 10/0525* (2013.01); *H01M 50/24* (2021.01);
(Continued)

(58) Field of Classification Search
CPC .... H01M 50/20; H01M 50/24; H01M 50/256; H01M 10/0525; H01R 13/6205;
(Continued)

(56) References Cited

U.S. PATENT DOCUMENTS 5,445,900 A    8/1995  Miller, Jr. et al.
5,801,921 A *  9/1998  Miller ..................... G06F 1/183
                                                                174/72 A
(Continued)

FOREIGN PATENT DOCUMENTS

| EP | 1 462 813 | 9/2004 |
|----|-----------|--------|
| EP | 2 083 462 | 7/2009 |
| EP | 2 919 569 | 9/2015 |

OTHER PUBLICATIONS

International Search Report issued in International Application No. PCT/CA2019/051354, dated Nov. 25, 2019, 4 pages.
(Continued)

*Primary Examiner* — Harshad C Patel
(74) *Attorney, Agent, or Firm* — Hamre, Schumann, Mueller & Larson, P.C.

(57) ABSTRACT

A method of transporting at least one energy storage device comprising the step of housing at least one energy storage device in a cassette comprising: a hollow casing for receiving at least one energy storage device; a top cap assembly received at one end of the hollow casing and an end cap assembly received at another end of the hollow casing; electronic circuitry housed within the end cap assembly, the electronic circuitry comprising at least one receptacle associated with each of the at least one energy storage devices, the at least one receptacle being reversibly mateable with at least one plug associated with an external device such that the cassette is received by the external in a first orientation and a second orientation; and electrically isolating the at
(Continued)

least one energy storage devices from each other by individually coupling the at least one energy storage device to the electronic circuitry.

17 Claims, 16 Drawing Sheets

(51) Int. Cl.
    *H01M 50/256* (2021.01)
    *H01M 10/0525* (2010.01)
    *H01R 13/62* (2006.01)
    *H01R 33/76* (2006.01)
    *H01R 33/88* (2006.01)
    *H01R 33/945* (2006.01)
    *H01R 43/26* (2006.01)
    *H02J 7/00* (2006.01)

(52) U.S. Cl.
    CPC ...... *H01M 50/256* (2021.01); *H01R 13/6205* (2013.01); *H01R 33/7664* (2013.01); *H01R 33/88* (2013.01); *H01R 33/945* (2013.01); *H01R 43/26* (2013.01); *H02J 7/0042* (2013.01)

(58) Field of Classification Search
    CPC .... H01R 43/26; H01R 33/7664; H01R 33/88; H01R 33/945; H02J 7/0042
    See application file for complete search history.

(56) References Cited

U.S. PATENT DOCUMENTS

| | | | | |
|---|---|---|---|---|
| 6,297,962 | B1 * | 10/2001 | Johnson | H05K 7/1421 |
| | | | | 361/740 |
| 6,326,103 | B1 | 12/2001 | Ido et al. | |
| 6,483,709 | B1 * | 11/2002 | Layton | H05K 7/1454 |
| | | | | 361/788 |
| 6,741,463 | B1 * | 5/2004 | Akhtar | H05K 7/1421 |
| | | | | 361/679.41 |
| 6,980,427 | B2 * | 12/2005 | Garnett | H05K 7/1425 |
| | | | | 714/763 |
| 7,408,772 | B2 * | 8/2008 | Grady | H05K 7/20581 |
| | | | | 361/679.48 |
| 7,897,277 | B2 | 3/2011 | Meyer et al. | |
| 7,997,908 | B2 * | 8/2011 | Murr | H01R 12/7047 |
| | | | | 439/76.1 |
| 8,272,878 | B2 * | 9/2012 | Neumetzler | H01R 13/6596 |
| | | | | 439/61 |
| 8,500,474 | B2 * | 8/2013 | Zimmermann | H01R 12/853 |
| | | | | 439/260 |
| 8,728,656 | B2 | 5/2014 | Takahashi et al. | |
| 8,925,739 | B2 * | 1/2015 | Crippen | H05K 7/1488 |
| | | | | 312/265.3 |
| 9,072,191 | B2 * | 6/2015 | Silberbauer | H05K 7/1457 |
| 9,590,370 | B1 * | 3/2017 | Lee | H05K 7/1492 |
| 9,591,784 | B2 * | 3/2017 | Butterbaugh | H05K 7/1488 |
| 2003/0002261 | A1 * | 1/2003 | Berry | H05K 7/1489 |
| | | | | 361/727 |

OTHER PUBLICATIONS

Written Opinion of the International Searching Authority issued in International Application No. PCT/CA2019/051354, dated Nov. 25, 2019, 5 pages.

Extended European Search Report issued in corresponding European Patent Application No. 19862739.0, dated May 16, 2022, 7 pages.

* cited by examiner

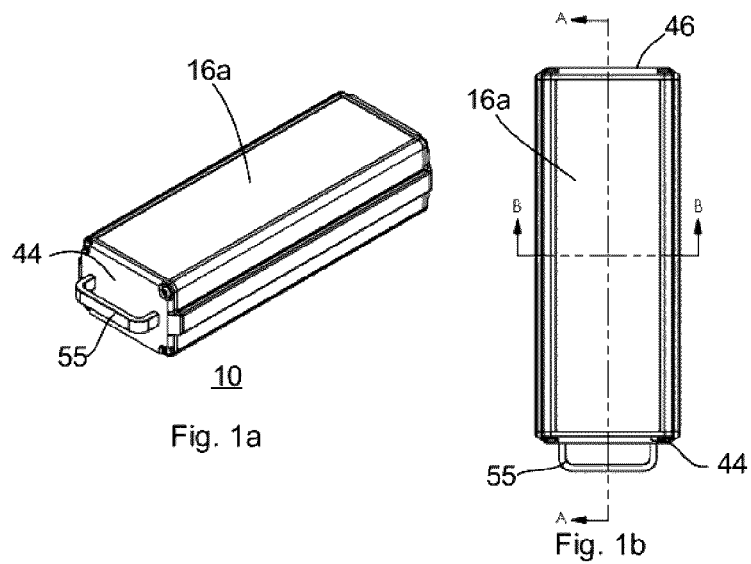
Fig. 1a
Fig. 1b
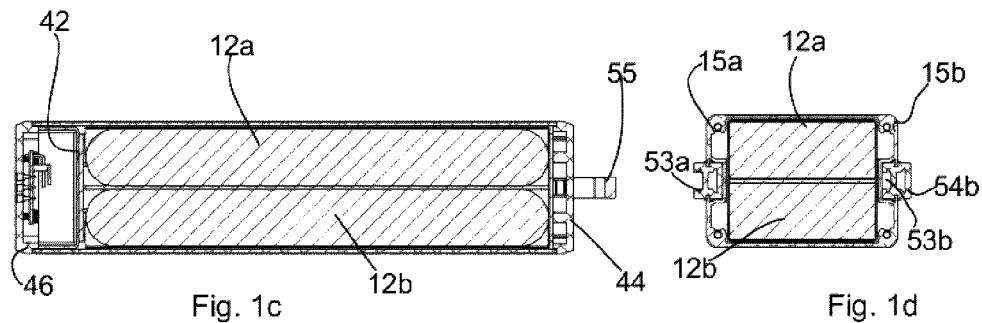
Fig. 1c
Fig. 1d
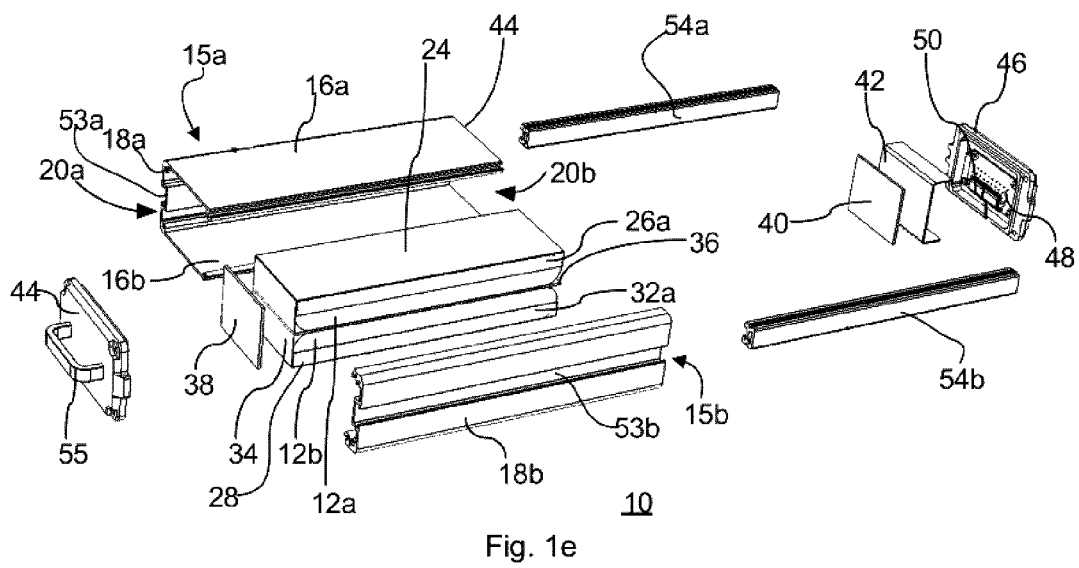
Fig. 1e

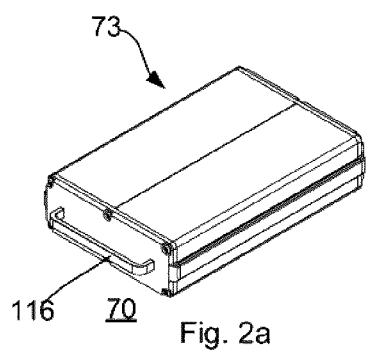
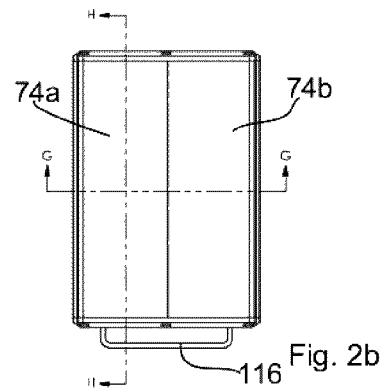
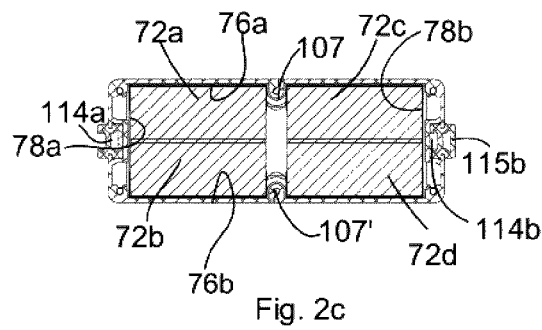
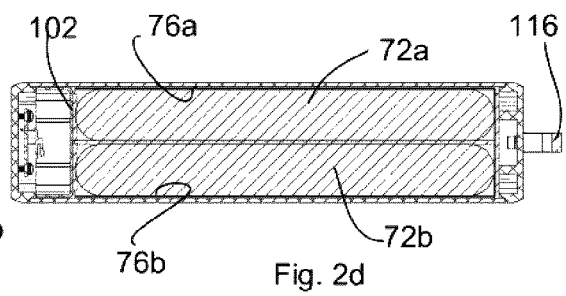
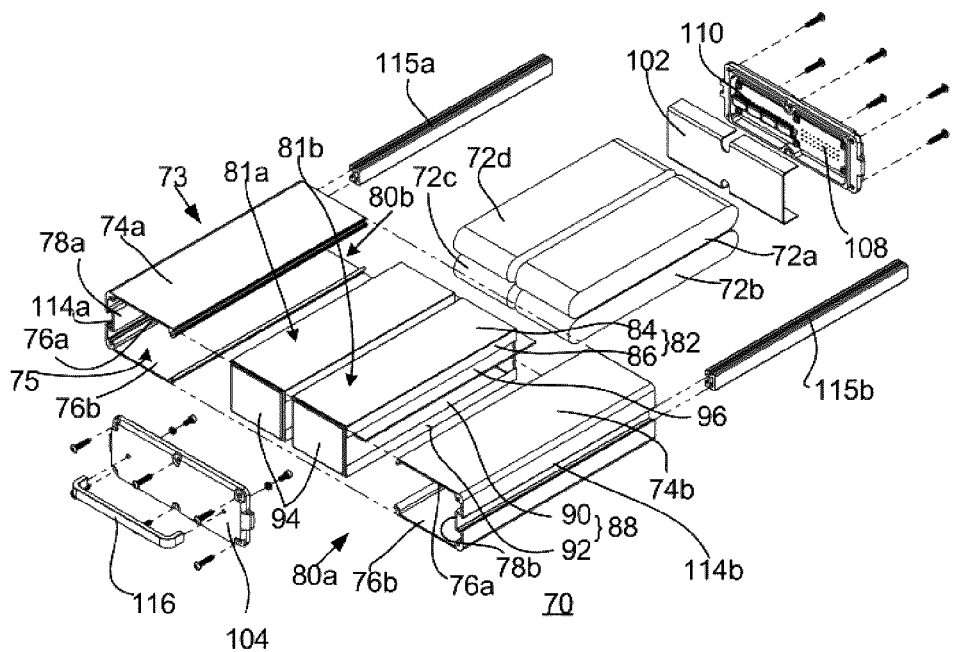

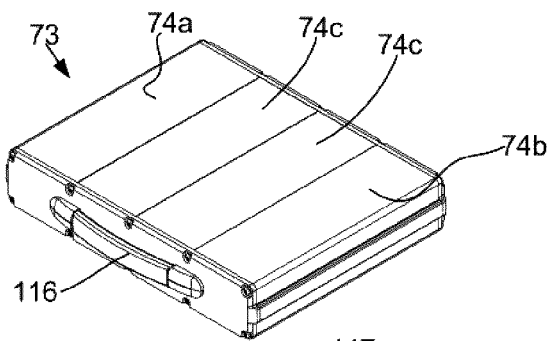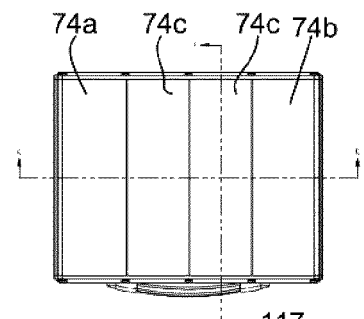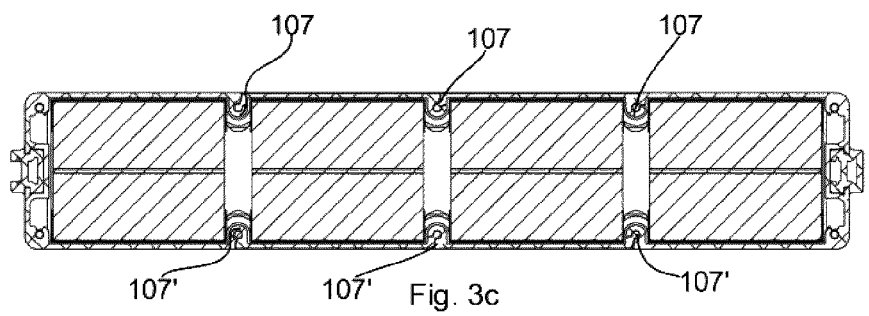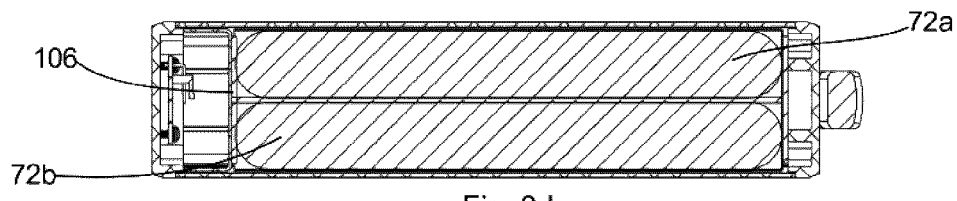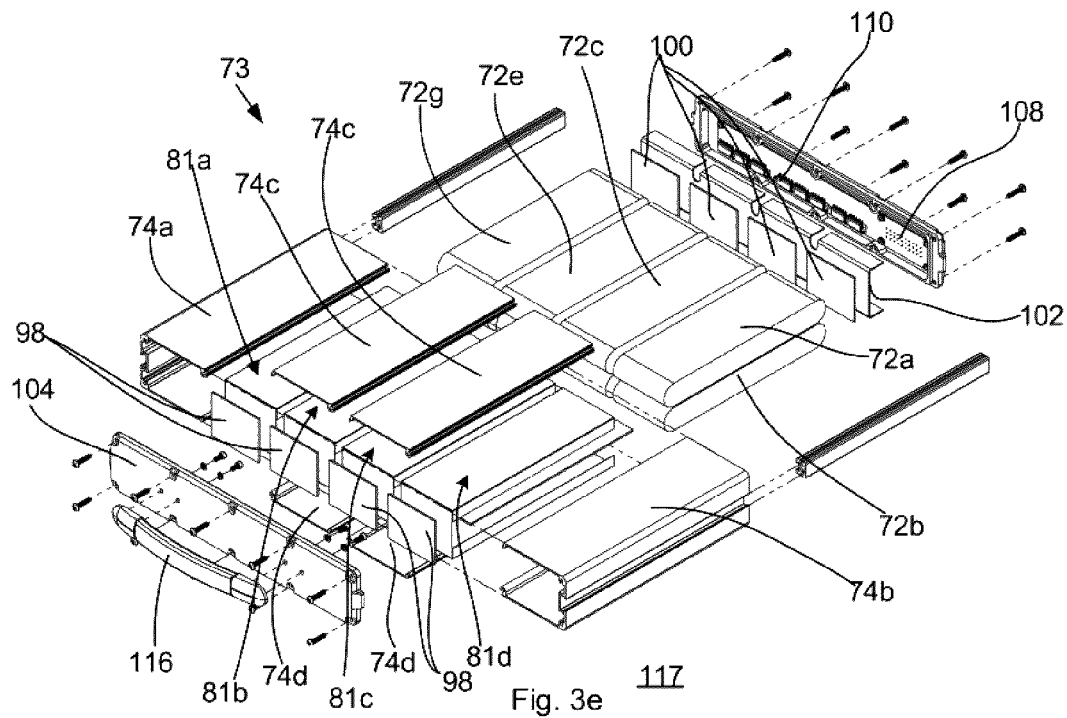

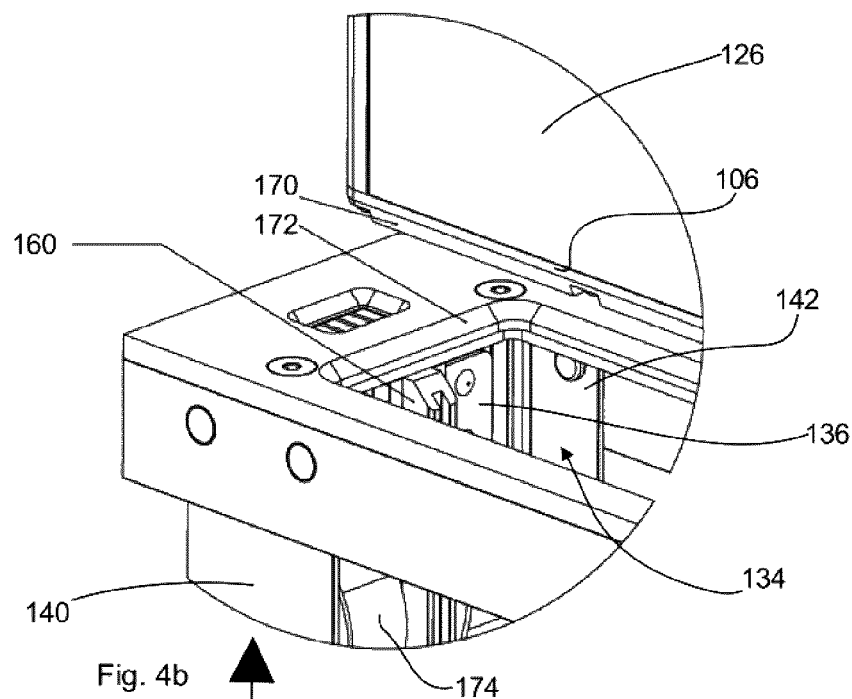
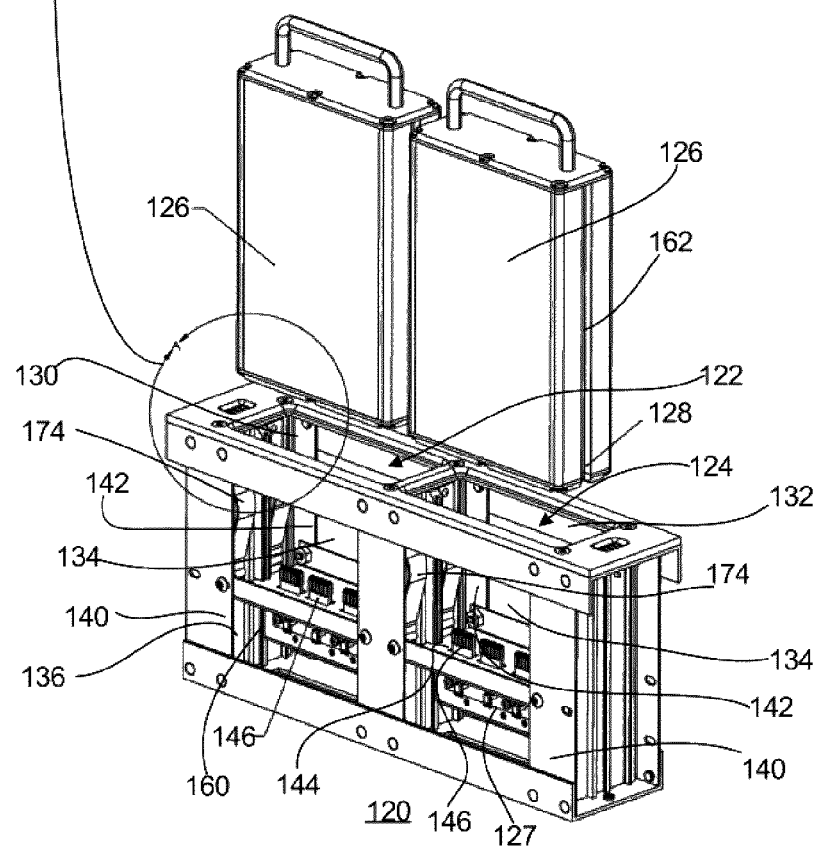
Fig. 4b
Fig. 4a

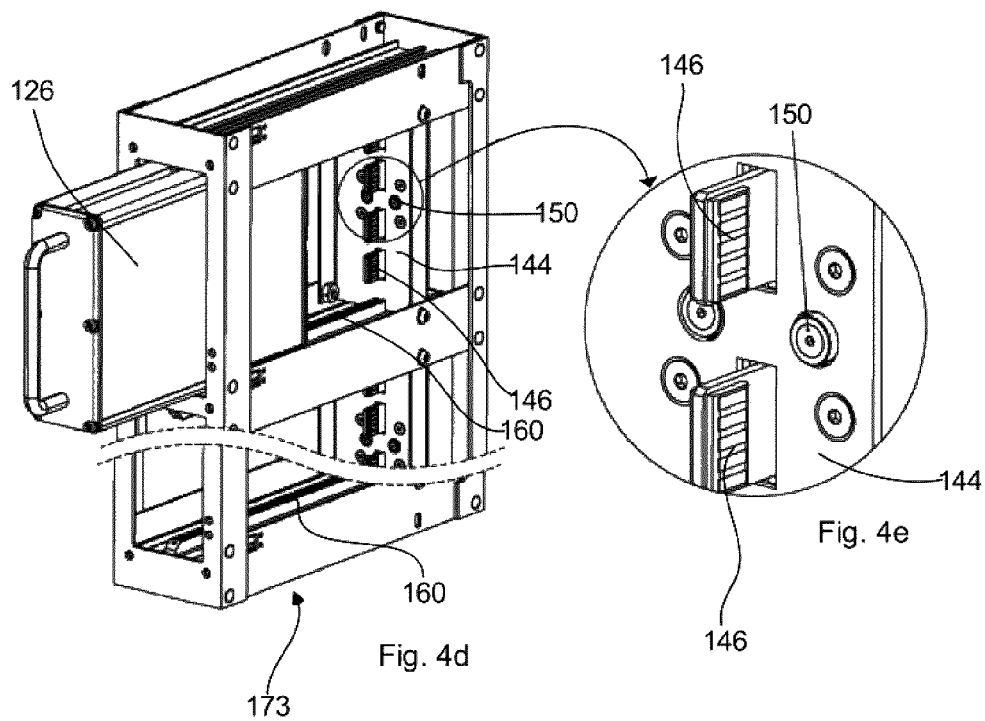
Fig. 4e
Fig. 4d
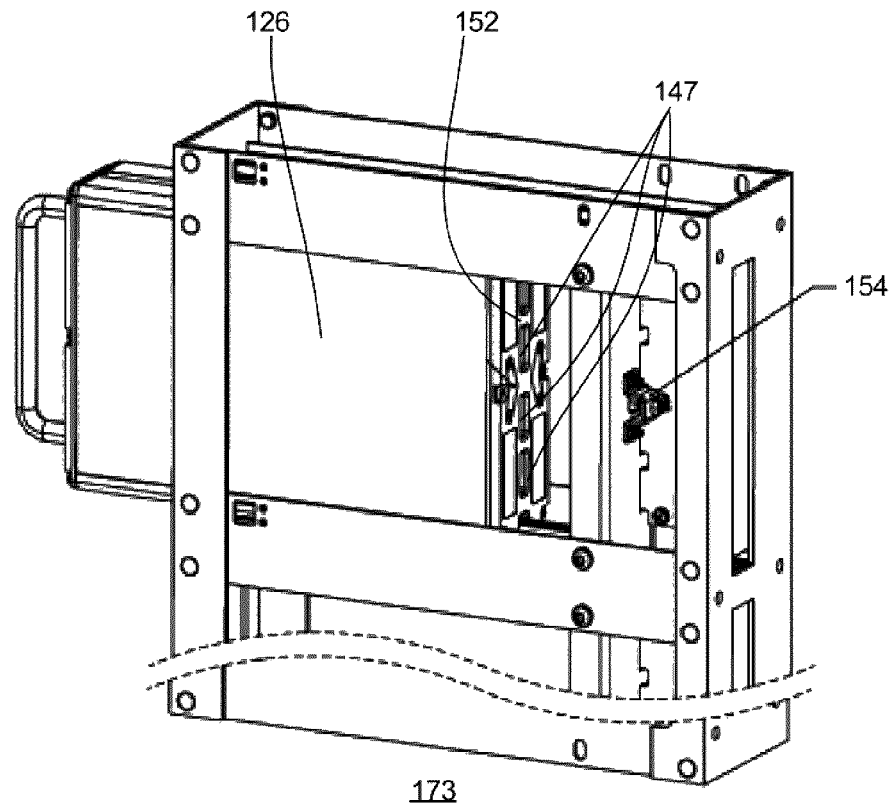
Fig. 4f

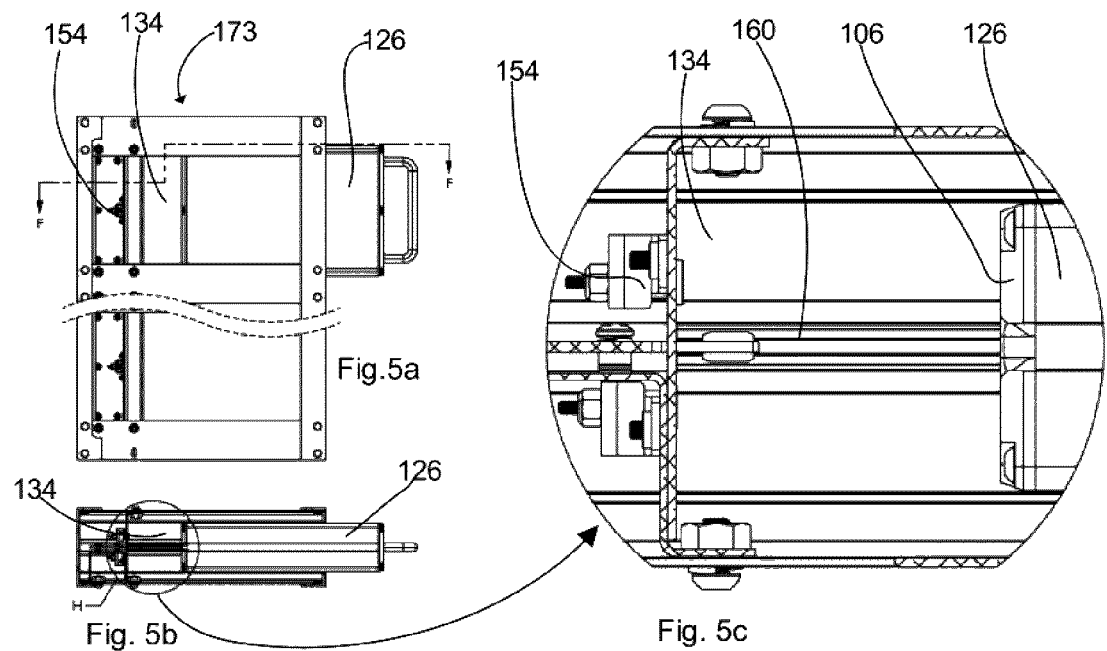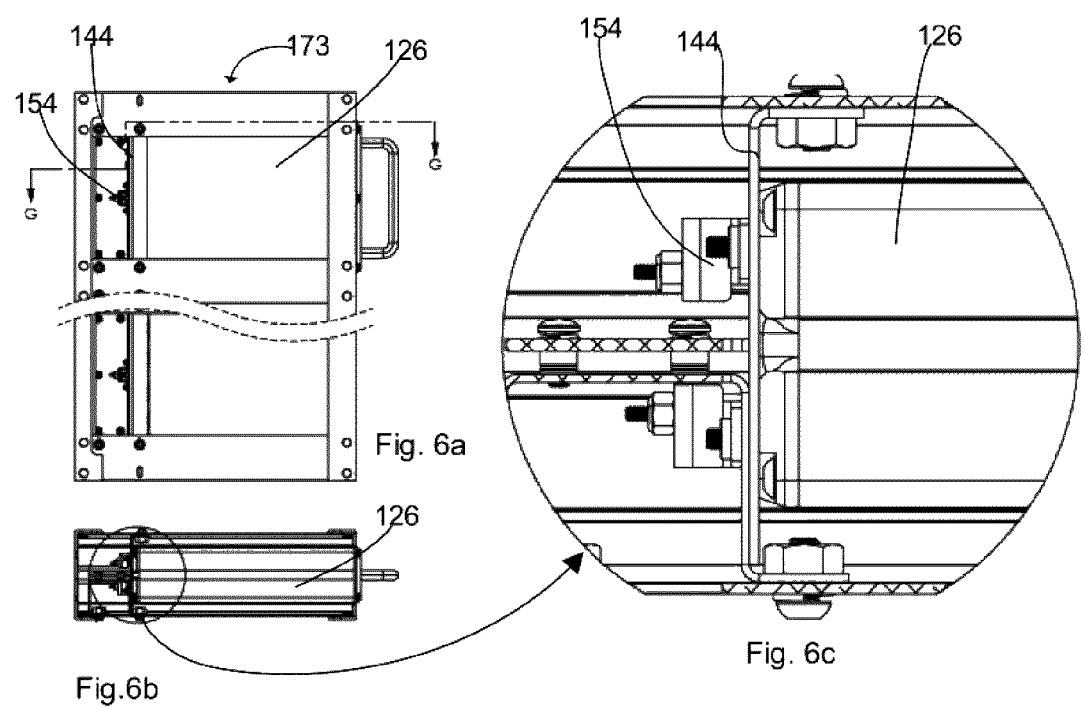

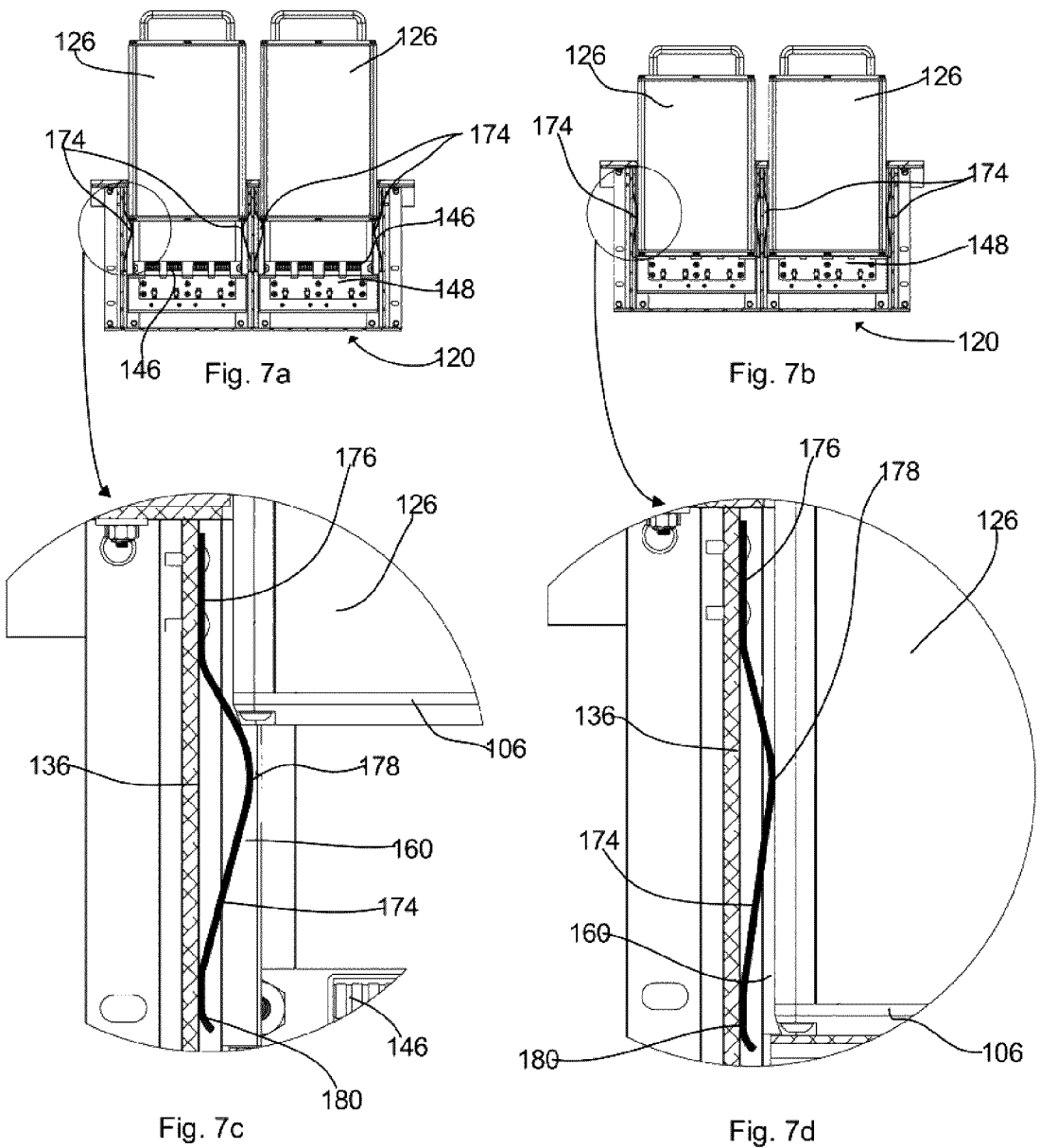

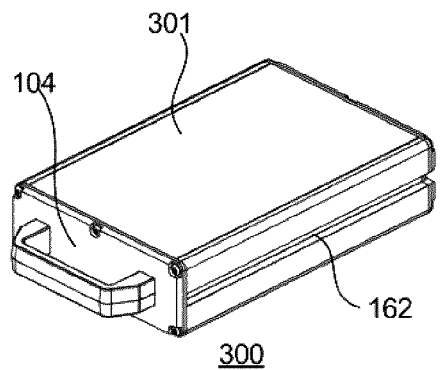
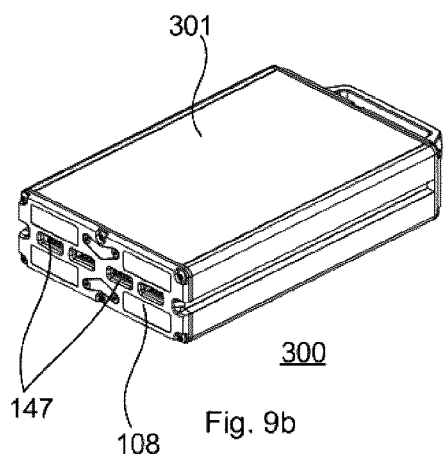
Fig. 9a
Fig. 9b
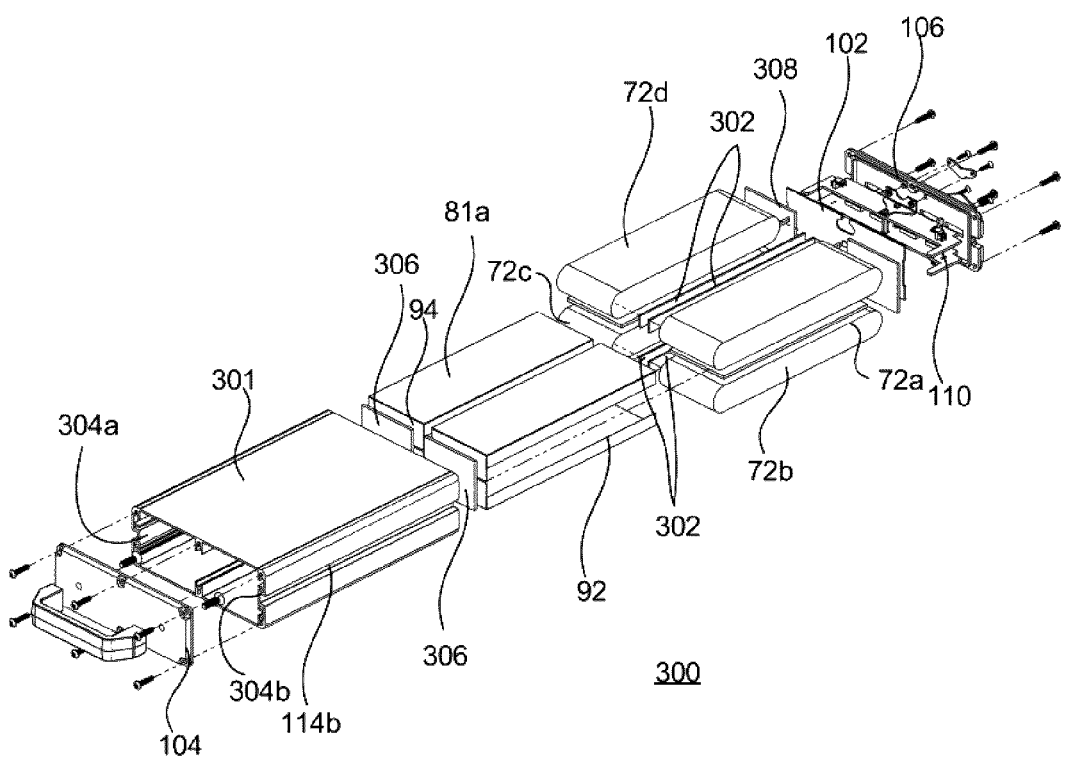
Fig. 9c

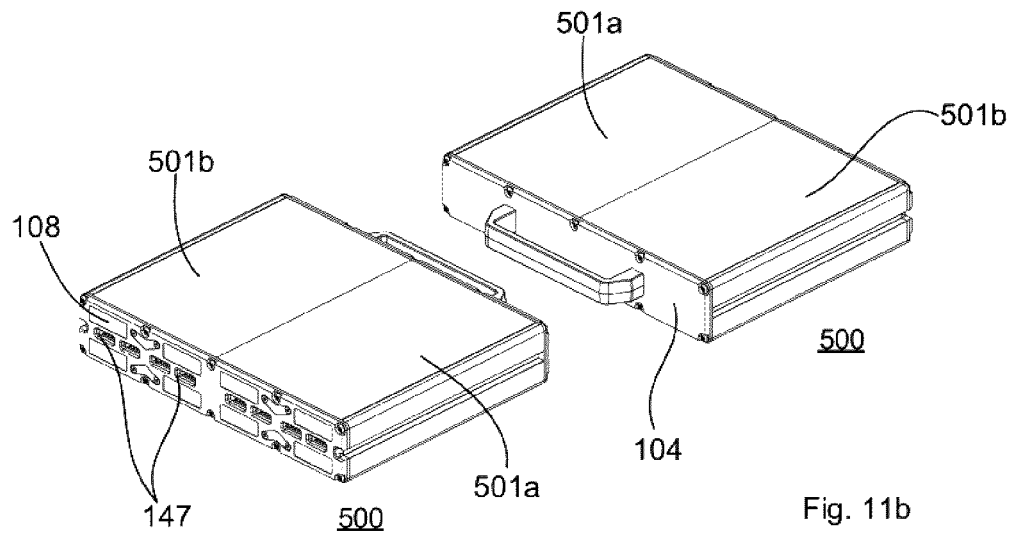
Fig. 11a
Fig. 11b
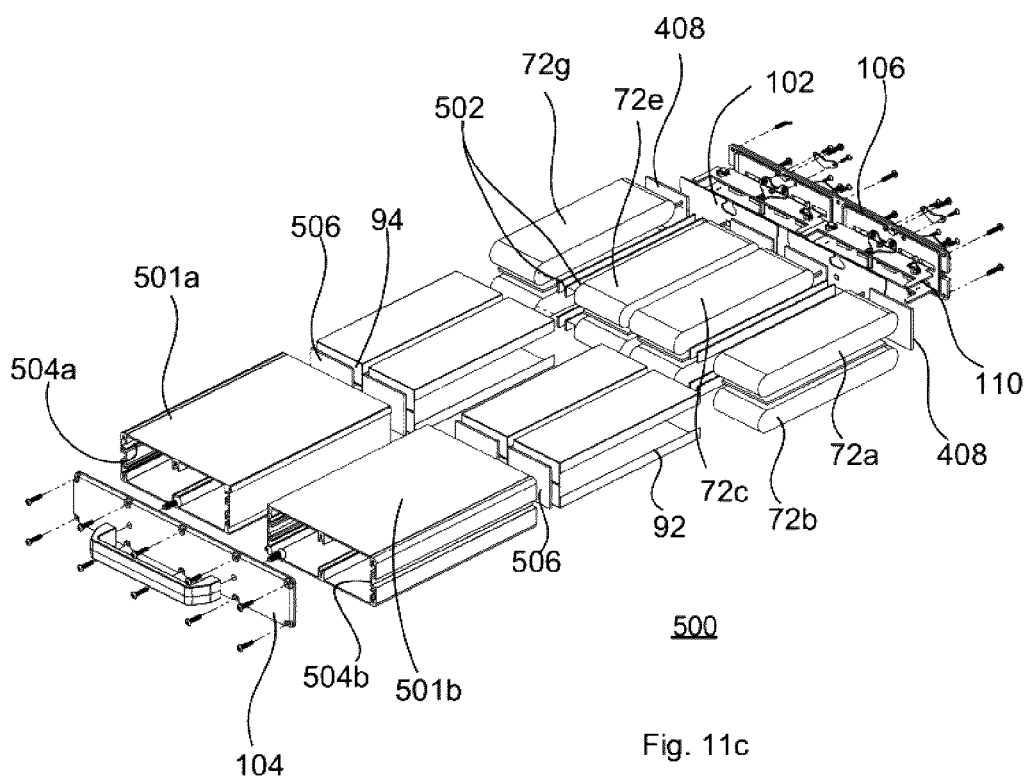
Fig. 11c

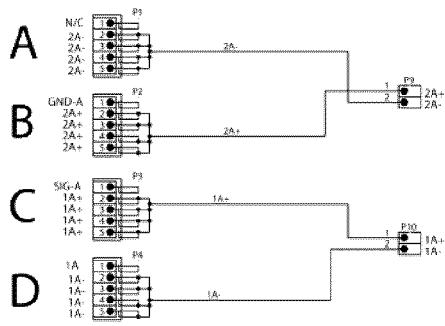
Fig. 11d
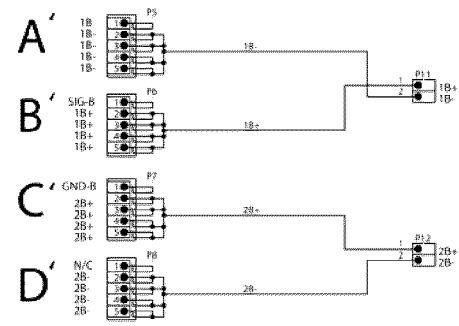
Fig. 11e
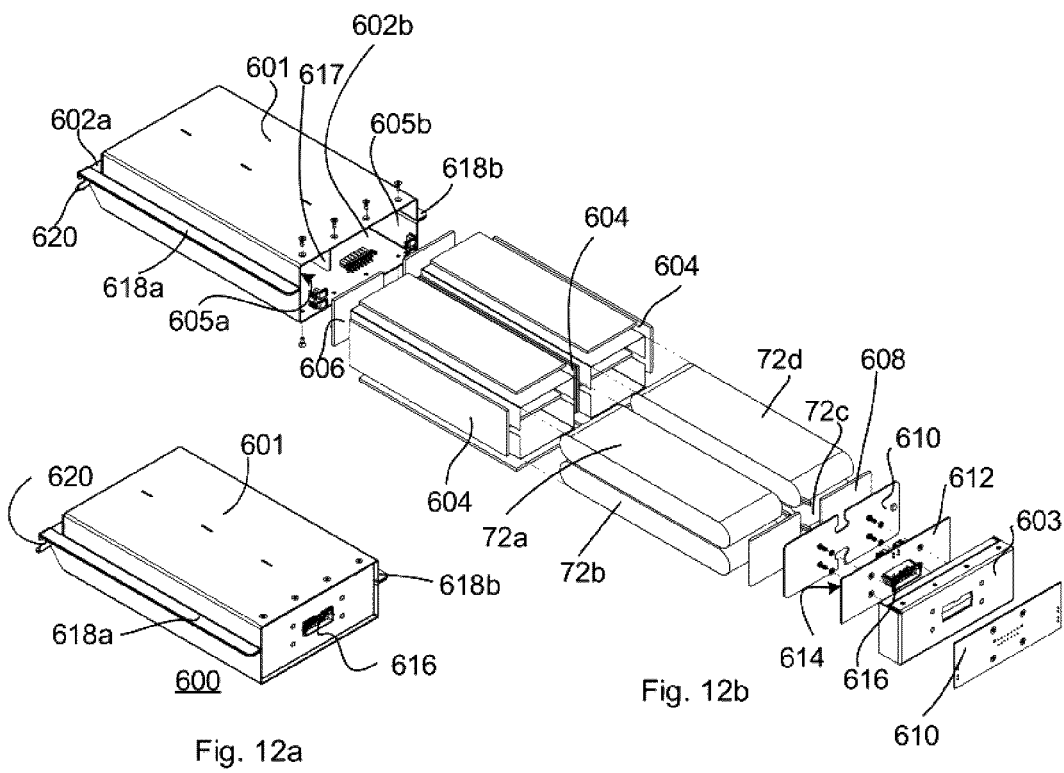
Fig. 12a
Fig. 12b

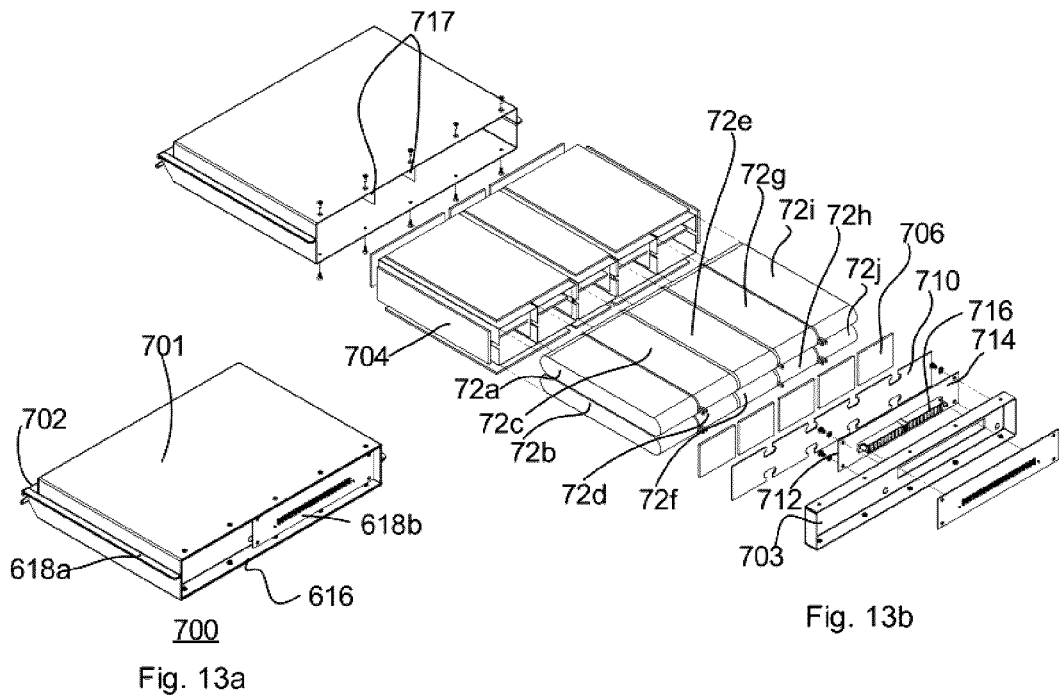
Fig. 13a
Fig. 13b
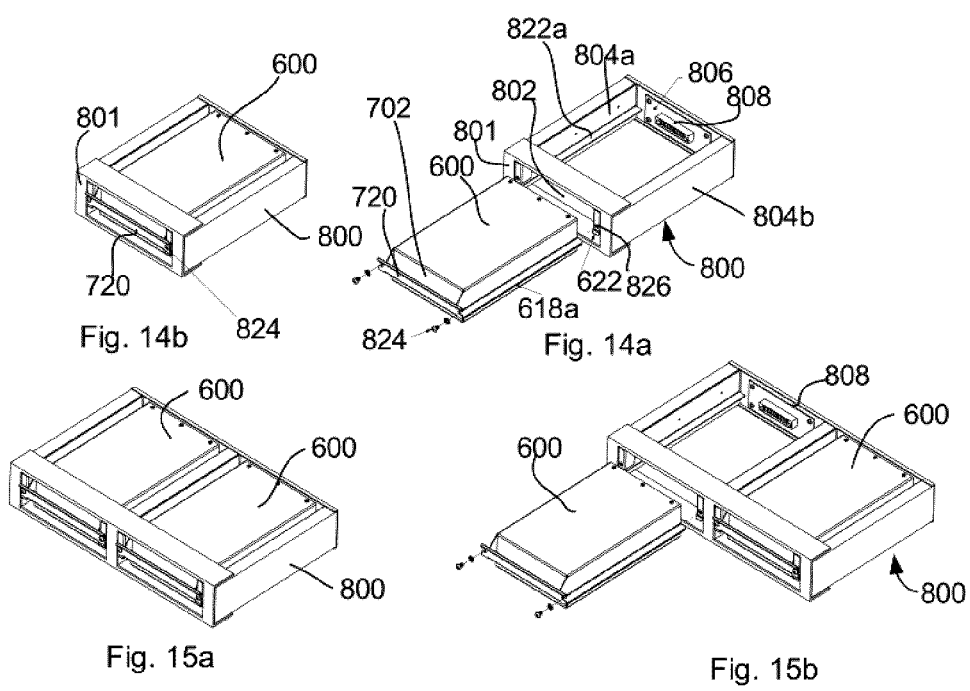
Fig. 14b
Fig. 14a
Fig. 15a
Fig. 15b

SAFE TRANSPORT AND STORAGE OF ENERGY STORAGE DEVICES

FIELD OF THE INVENTION

The present invention relates to electrical storage devices, more particularly it pertains to the transport and storage of battery packs.

BACKGROUND

Lithium batteries are used to power a wide range of electronic devices and equipment including items such as laptop computers, cell phones/smartphones, cameras, medical equipment and power tools. Lithium batteries are also considered dangerous goods and may be subject to U.S., Canadian, and international safety regulations. For example, lithium batteries are regulated by the UN Model Regulation for the Transport of Dangerous Goods, under CLASS 9 Dangerous Goods due to their dual hazard properties associated with their chemical and electrical content, under identification number UN 3480 (pertaining to Lithium-Ion Batteries only) and under identification number UN 3481 (pertaining to Lithium-Ion Batteries contained in equipment or packed with equipment). In Canada, lithium ion batteries are regulated by the Transport of Dangerous Goods Act and Regulations under Special Provision Number 34, (TDGR Schedule 2). The Regulatory Exemption for Lithium Batteries.

Lithium ion batteries are exempt from the regulations if the following guidelines for exemption are met:

a) for a lithium metal or lithium alloy cell, the lithium content is not more than 1 g, and, for a lithium-ion cell, the watt-hour rating is not more than 20 Wh;

b) for a lithium metal or lithium alloy battery, the aggregate lithium content is not more than 2 g, and for a lithium-ion battery, the watt-hour rating is not more than 100 Wh;

c) the cells and batteries are afforded protection against short circuit, including protection against contact with conductive materials within the same packaging that could lead to a short circuit;

d) the cells and batteries are packed in a means of containment that completely encloses the cells and batteries;

e) the gross mass of the cells and batteries does not exceed 30 kg, except when the cells and batteries are installed in or packed with equipment.

Accordingly, transportation of batteries exceeding 100 Wh is prohibited and subject to fines.

It is thus an object of the present invention to mitigate or obviate at least one of the above-mentioned disadvantages.

SUMMARY OF THE INVENTION

In one of its aspects, there is provided a cassette for housing at least one energy storage device, the cassette comprising:
 a hollow longitudinal casing for receiving at least one energy storage device;
 a top cap assembly received at one end of the hollow longitudinal casing and an
end cap assembly received at another end of the hollow longitudinal casing;
 electronic circuitry housed within the end cap assembly, the electronic circuitry
comprising at least one receptacle associated with each of the at least one energy devices, the at least one receptacle mateable with at least one plug associated with an external device; wherein the at least one energy storage device is individually coupled to the electronic circuitry and electrically isolated from other at least one energy storage devices; and wherein the at least one receptacle comprises a first plurality of receptacle metallic contacts and a second plurality of receptacle metallic contacts, such that the cassette is coupled to the external device in a first orientation via the first plurality of receptacle metallic contacts, or in a second orientation via the plurality of second plurality of plug metallic contacts, such that the cassette is reversibly received in the external device;
 opposed channel rails disposed on the hollow casing;
 wherein the channel rails are received by alignment channels associated with the
external device, such that the cassette is urged along the alignment channels until the at least one receptable engages the at least one plug for electrical connectivity.

In another of its aspects, there is provided a method of transporting at least one energy storage device, the method comprising the steps of:
 housing at least one energy storage device in a cassette comprising:
  a hollow casing for receiving at least one energy storage device;
  a top cap assembly received at one end of the hollow casing and an end cap assembly received at another end of the hollow casing; electronic circuitry housed within the end cap assembly, the electronic circuitry comprising at least one receptacle associated with each of the at least one energy sources, the at least one receptacle mateable with at least one plug associated with an external device;
  opposed channel rails disposed on the hollow casing; wherein the channel rails are received by alignment channels associated with the external device, such that the cassette is urged along the alignment channels until the at least one receptable engages the at least one plug for electrical connectivity;
  the at least one receptacle comprising a first plurality of receptacle metallic contacts and a second plurality of receptacle metallic contacts, such that the cassette is coupled to the external device in a first orientation via the first plurality of receptacle metallic contacts, or in a second orientation via the plurality of second plurality of plug metallic contacts, such that the cassette is reversibly received in the external device;
 electrically isolating the at least one energy storage device from other at least one energy storage devices by individually coupling the at least one energy storage device to the electronic circuitry.

In another of its aspects, there is provided a handling apparatus for at least one battery pack, the handling apparatus comprising:
 a hollow casing comprising an upper longitudinal protective tray element and a lower longitudinal protective tray element with a lower longitudinal base for receiving the at least one battery pack;
 at least one first shock absorbent end-pad abutting one end of the at least one battery pack and at least one second shock absorbent end-pad abutting another end of the at least one battery pack;
 at least one divider board abutting the at least one second shock absorbent end-pad;
 at least one side shock absorbent pad positioned between at least one side of the least one battery pack and an interior wall of the hollow casing;

a top cap assembly received at one end of the hollow casing and an end cap assembly received at another end of the hollow casing;

at least one divider board abutting the end cap assembly;

electronic circuitry housed within the end cap assembly, the electronic circuitry comprising at least one input/output port electrically coupled to the at least one battery pack;

at least one first shock absorbent end-pad positioned between one end of the at least one battery pack and the top cap assembly; and at least one second shock absorbent end-pad positioned between another end of the at least one battery pack and at least one divider board;

whereby the at least one battery pack is contained within the hollow casing closed at either end by the top cap assembly and the end cap assembly.

In another of its aspects, there is provided a receiver for a cassette comprising at least one battery pack, the receiver comprising:

side walls;

a face at one of the sidewalls, said face having an opening therein;

a receiver connection board at another end of the side walls;

at least one alignment channel disposed on an interior surface of each of the sidewalls;

whereby a cavity is defined between the opening, the side walls, and the receiver connection board.

In another of its aspects, there is provided a cassette comprising input/output receptacle ports configured to receive reversible or dual orientation male plug connectors, such that the cassette can be plugged in into the load or the charger with no regard to its orientation. Accordingly, the input/output receptacle ports can have a 180-degree symmetrical, double orientation design, which enables the male plug connector to be inserted into a corresponding receptacle connector in either of two intuitive orientations, aided by the cassette guides.

In another embodiment, the cassette also includes important safety features, such as the grouping of the port contacts designed to prevent accidental shorting of individual battery packs.

Advantageously, a plurality of battery packs rated below 100 Wh may be contained within the cassette such that the battery packs can have a combined energy of more than 100 Wh, while adhering to the above-noted regulations. Accordingly, one or more battery packs, such as Lithium ion cell packs in a convenient carrying case, which provides quick connectivity of the individual packs to their loads or charging devices without any interconnection between the packs and without the need to remove the battery packs from the case. In addition, spring-loaded contacts may be employed for effortless, reliable "plug-in" interconnectivity between the cassette and the loads or charging devices, and also provide quadruple redundancy of connectors for individual power lines.

BRIEF DESCRIPTION OF THE DRAWINGS

Several exemplary embodiments of the present invention will now be described, by way of example only, with reference to the appended drawings in which:

FIG. 1a shows an isometric view of an exemplary battery pack cassette;

FIG. 1b shows a plan view of the cassette of FIG. 1a;

FIG. 1c shows a sectional view taken along line B-B in FIG. 1b;

FIG. 1d shows a sectional view taken along line A-A in FIG. 1b;

FIG. 1e shows an exploded view of the cassette of FIG. 1a;

FIG. 2a shows an isometric view of an exemplary another battery pack cassette;

FIG. 2b shows a plan view of the exemplary battery pack cassette of FIG. 2a;

FIG. 2c shows a sectional view taken along line G-G in FIG. 2b;

FIG. 2d shows a sectional view taken along line H-H in FIG. 2b;

FIG. 2e shows an exploded view of cassette of FIG. 2a;

FIG. 3a shows an isometric view of yet another exemplary battery pack cassette;

FIG. 3b shows a plan view of the exemplary battery pack cassette of FIG. 3a;

FIG. 3c shows a sectional view taken along line K-K in FIG. 3b;

FIG. 3d shows a sectional view taken along line L-L in FIG. 3b;

FIG. 3e shows an exploded view of the exemplary battery pack cassette of FIG. 3a;

FIG. 4a shows an isometric view of an exemplary receiver associated with a charging cart assembly, host equipment or rack for battery pack cassettes;

FIG. 4b shows an exploded view of the exemplary receiver for the battery pack cassettes;

FIGS. 4d and 4f show isometric views of an exemplary receiver or discharge bay assembly associated with a charging cart assembly, host equipment or rack for battery pack cassettes;

FIG. 4e shows a detailed view of a portion of the receiver or discharge bay assembly for battery pack cassettes;

FIG. 5a shows a plan view of the receiver or discharge bay assembly with a battery pack cassette partially inserted therein;

FIG. 5b shows a side view of the receiver or discharge bay assembly with a battery pack cassette partially inserted therein;

FIG. 5c shows a detailed view of the receiver or discharge bay assembly with a battery pack cassette partially inserted therein;

FIG. 6a shows a plan view of the receiver or discharge bay assembly with a battery pack cassette fully engaged therein;

FIG. 6b shows a side view of the receiver or discharge bay assembly with a battery pack cassette fully engaged therein;

FIG. 6c shows another a detailed view of a portion of the exemplary receiver or discharge bay assembly with a battery pack cassette fully engaged therein;

FIG. 7a shows a front view of an exemplary receiver with two battery pack cassettes partially inserted therein;

FIG. 7b shows a front view of the exemplary receiver with the two battery pack cassettes fully engaged therein;

FIG. 7c shows a detailed view of a portion of the receiver with the battery pack cassette partially inserted therein;

FIG. 7d shows a detailed view of a portion of the exemplary receiver with the battery pack cassette fully engaged therein;

FIG. 8b shows another isometric view of the battery pack cassette of FIG. 8a;

FIG. 8c shows an exploded view of the battery pack cassette of FIG. 8a;

FIG. 9a shows an isometric view of another exemplary another battery pack cassette comprising a single hollow body casing;

FIG. 9b shows another isometric view of the battery pack cassette of FIG. 9a;

FIG. 9c shows an exploded view of the battery pack cassette of FIG. 9a;

FIG. 10a shows an isometric view of yet another exemplary battery pack cassette comprising a single hollow body casing;

FIG. 10b shows another isometric view of the battery pack cassette of FIG. 10a;

FIG. 10c shows an exploded view of the battery pack cassette of FIG. 10a;

FIG. 11a shows an isometric view of yet another exemplary battery pack cassette comprising a single hollow body casing;

FIG. 11b shows another isometric view of the battery pack cassette of FIG. 11a;

FIG. 11c shows an exploded view of the battery pack cassette of FIG. 11a;

FIGS. 11d and 11e show a wiring diagram for contacts associated with the receptacle connector of a cassette for electrically isolating each of the battery packs;

FIG. 12a shows an isometric view of a battery pack cassette, in another embodiment;

FIG. 12b shows an exploded view of the battery pack cassette of FIG. 12a;

FIG. 13a shows an isometric view of the battery pack cassette, in another embodiment;

FIG. 13b shows an exploded view of the battery pack cassette of FIG. 13a;

FIG. 14a shows an isometric view of the battery pack cassette of FIG. 12a and a receiver;

FIG. 14b shows a view of the battery pack cassette housed within the receiver;

FIG. 15a shows an isometric view of two battery pack cassettes and a receiver, in another implementation;

FIG. 15b shows a view of two battery pack cassettes housed within the receiver;

DETAILED DESCRIPTION OF EXEMPLARY EMBODIMENTS

Figure 4C:
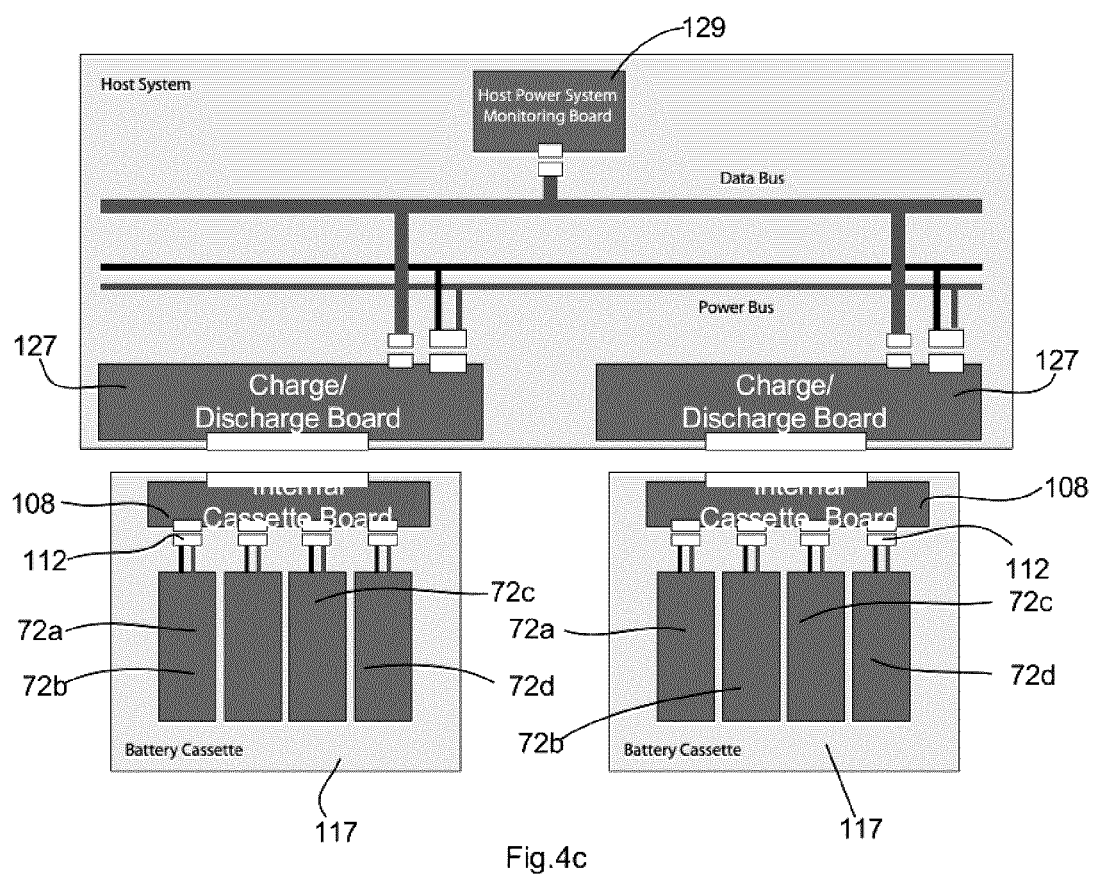
FIG. 4c is a schematic illustrating interconnectivity between a cassette internal printed circuit board, cassette discharge printed circuit board, and a host power system monitoring printed circuit board associated with a charging cart assembly, host equipment or rack.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

With reference to FIGS. 1a-1e, there is shown an exemplary enclosure or cassette 10 for at least two battery packs 12a, 12b. Cassette 10 may be a storage and transport cassette comprising hollow longitudinal casing 14 formed of C-shaped shell 15a and side panel 15b. Hollow longitudinal casing 14 comprises upper wall 16a, lower wall 16b and opposed side walls 18a, 18b, with first open end 20a and second open end 20b. Housed within hollow longitudinal casing 14 are interior cassette components comprising upper longitudinal protective tray element 22 comprising upper longitudinal base 24 having opposed longitudinal walls 26a, 26b; and lower longitudinal protective tray element 28 with lower longitudinal base 30 having opposed longitudinal walls 32a, 32b. Upper longitudinal base 24 is adjacent to an interior surface of upper wall 16a, and lower longitudinal base 30 is adjacent to an interior surface of lower wall 16b. Upper and lower longitudinal protective tray elements 24, 28 are connected by linking member 34 at one end of upper and lower longitudinal protective tray elements 24, 28. As an example, battery pack 12b is received by lower longitudinal protective tray element 28 such that battery pack 12b rests on lower longitudinal base 30, and abuts opposed longitudinal walls 32a, 32b; and battery pack 12a is received by upper longitudinal protective tray element 24 such that upper longitudinal base 24 rests on battery pack 12a, and abuts opposed longitudinal walls 26a, 26b; and linking member 34 abuts one end of battery packs 12a, 12b. Accordingly, battery packs 12a, 12b are disposed in a stacked arrangement. Upper and lower longitudinal protective tray elements 24, 28 are preferably made from fiber board, or any other suitable structural sheathing material that includes impact resistance and shock absorbance qualities. Hollow longitudinal casing 14 may be formed from a metal, such as aluminum, however other suitable materials may be employed, such as plastic Intermediary shock absorbent pad 36 separates two battery packs 12a, 12b, and first shock absorbent end-pad 38 abuts linking member 34 and second shock absorbent end-pad 40 abuts another end of battery packs 12a, 12b, and divider board 42 abuts second shock absorbent end-pad 40. With the interior cassette components ensconced within hollow longitudinal casing 14, top cap assembly 44 is received at first open end 20a, abutting first shock absorbent end-pad 38; and end cap assembly 46 is received at second open end 20b. End cap assembly 46 also houses printed circuit board 48 comprising electronic circuitry 50 with a plurality of electronic components, including connectors 52 (not shown) for individual electrical coupling and isolation of each of battery packs 12a, 12b to the electronic circuitry 50, as will be described in more detail with reference to FIG. 4c. Accordingly, each of battery packs 12a, 12b comprises wires coupled thereto terminating at a female/male connector (not shown). End cap assembly 56 may be fabricated from a metal, such as aluminum, or a suitable fire-retardant material. For example, a suitable fire-retardant material may be a polycarbonate resin (e.g. a flame-retardant resin which meets the requirements of UL94V-O. Electronic circuitry 50 comprises means for monitoring battery temperatures, such as a thermal sensor, and in-line power fuses for individual battery packs 12a, 12b. As will be described below, electronic circuitry 50 may be coupled to a receiver associated with the host equipment, rack, or external charging cart assembly 120 via connectors 52 for charging, discharging and monitoring battery packs 12a, 12b individually. Divider board 42 may be a printed circuit board with circuitry and components, such as thermal sensor, and separates the battery pack compartment from the compartment with the printed circuit board 48. Top cap assembly 44 and end cap assembly 46 are secured to hollow longitudinal casing 14 via retaining means, or fasteners, such as screws or tamper-proof screws.

Each of the exterior surfaces of opposed side walls 18a, 18b of cassette 10 comprise alignment channels 53a, 53b which receive alignment rails 54a, 54b of the receiver associated with the host equipment, rack, or external charging cart assembly, as will be described below in FIGS. 4a and 5a. Accordingly, cassette 10 is able to slide along the alignment rails to facilitate insertion and/or removal thereof to/from the host equipment, charging cart assembly, or rack. Top cap assembly 44 also includes handle 54 for easy handling. In another implementation, cassette 10 comprises alignment rails and the receiver associated with the host equipment, charging cart assembly, or rack, comprises alignment channels and therefore the channel rails of cassette 10 are introduced into alignment channels of the receiver associated with the host equipment, charging cart assembly, or rack.

Now looking at FIGS. 2a, 2b, 2c and 2d there is shown another exemplary storage and transport cassette 70 which houses four battery packs 72a, 72b, 72c and 72d. Cassette 70 comprises hollow longitudinal casing 73 with two C-shaped shells 74a, 74b which define cavity 75 formed by upper wall 76a, lower wall 76b and opposed side walls 78a, 78b, with first open end 80a and second open end 80b. Housed within hollow longitudinal casing 73 are interior cassette components comprising a pair of protective tray elements 81a, 81b, and each of protective tray elements 81a and 81b comprise upper longitudinal protective tray element 82 comprising upper longitudinal base 84 having opposed longitudinal walls 86, 86'; and lower longitudinal protective tray element 88 with lower longitudinal base 90 having opposed longitudinal walls 92', 92'. Upper longitudinal base 84 is adjacent to an interior surface of upper wall 76a, and lower longitudinal base 90 is adjacent to an interior surface of lower wall 76b. Upper and lower longitudinal protective tray elements 82, 88 are connected by linking member 94 at one end of upper and lower longitudinal protective tray elements 82, 88. As an example, battery pack 72b is received by lower longitudinal protective tray element 88 of protective tray element 81b such that battery pack 72b rests on lower longitudinal base 90, and abuts opposed longitudinal walls 92, 92'; and battery pack 72a is received by upper longitudinal protective tray element 82 such that upper longitudinal base 84 rests on battery pack 72a, and abuts opposed longitudinal walls 86, 86'; and linking member 94 abuts one end of battery packs 72a, 72b. Accordingly, battery packs 72a, 72b are disposed in a stacked arrangement. Upper and lower longitudinal protective tray elements 82, 88 is preferably made from fiber board, or any other suitable structural sheathing material that includes impact resistance and shock absorbance qualities.

Intermediary shock absorbent pad 96 separates two battery packs 72a, 72b, and first shock absorbent end-pad 98 abuts linking member 94 and second shock absorbent end-pad 100 abuts another end of battery packs 72a, 72b.

With the interior cassette components ensconced within hollow longitudinal casing 73, top cap assembly 104 is received at first open end 80a, abutting first shock absorbent end-pad 98; and end cap assembly 106 is received at second open end 80b and abuts divider board 102. Top cap assembly 104 and end cap assembly 106 are secured to hollow longitudinal casing 73 with suitable retaining means.

Similarly, battery pack 72c is received by lower longitudinal protective tray element 88 of protective tray element 81a such that battery pack 72c rests on lower longitudinal base 90, and abuts opposed longitudinal walls 92, 92'. Battery pack 72d is received by upper longitudinal protective tray element 82 such that upper longitudinal base 84 rests on battery pack 72d, and abuts opposed longitudinal walls 86, 86'; and linking member 94 abuts one end of battery packs 72a, 72b. Accordingly, battery packs 72c, 72d are disposed in a stacked arrangement. Abutting from upper wall 76a is reduced-height longitudinal wall 107 which abuts longitudinal walls 86, 86' of upper longitudinal base 84; and abutting from lower wall 76b is reduced-height longitudinal wall 107' which abuts longitudinal walls 92, 92' of lower longitudinal base 90. Divider board 102 abuts second shock absorbent end-pad 100, and holds battery packs 72a, 72b in place. Divider board also carries a thermal sensor and memory means with digital ID associated with cassette 70 and/or battery packs 72a, 72b, 72c and 72d.

End cap assembly 106 also houses printed circuit board 108 comprising electronic circuitry 110 with a plurality of electronic elements, including input/output ports 112 for individual electrical coupling of each of battery packs 72a, 72b, 72c, and 72d to electronic circuitry 110. Accordingly, each of battery packs 72a, 72b, 72c, and 72d comprises wires coupled thereto terminating at a connector receivable by input/output ports 112. Top cap assembly 104 and end cap assembly 106 are secured to hollow longitudinal casing 73 via retaining means, such as screws. Printed circuit board 108 carries a thermal sensor and memory means with digital ID associated with cassette 70 and/or battery packs 72a-d, and facilitates fused connectivity between battery packs 72a-d, and receiver discharge/charging boards 127 as well as between the thermal sensor and receiver discharge/charging boards 127. Electronic circuitry 110 also facilitates fused connectivity between battery packs 72a-d and receiver discharge/charging boards 127, as well as between the divider board 102 and receiver discharge/charging boards 127.

Each of the exterior surfaces of opposed side walls 78a, 78b comprise alignment channels 114a, 114b, to facilitate insertion and/or removal of storage and transport cassette 70 to/from a receiver associated with the equipment in use, a charging cart assembly, or rack. Top cap assembly 104 also includes handle 116 for easy handling. In another implementation, cassette 70 comprises alignment rails and the receiver associated with the host equipment, charging cart assembly, or rack, comprises alignment channels and therefore the channel rails of cassette 70 are introduced into alignment channels of the receiver associated with the host equipment, charging cart assembly, or rack.

FIG. 3a-3e illustrates yet another embodiment of a storage and transport cassette in which the hollow longitudinal casing comprises multiple parts, such as two C-shaped shells coupled to each other to define a cavity for receiving battery packs, or two C-shaped shells coupled to each other via one or more intermediary upper walls and one or more intermediary lower walls to define the cavity. FIG. 3a-3e show a storage and transport cassette 117 which accommodates eight battery cells 70a-h in hollow longitudinal casing 73 formed by two C-shaped shells 74a, 74b, with two top panels 74c and two bottom panels 74d therebetween. Accordingly, various configurations of battery packs may be stored and/or transported by cassette 117. Accordingly, cassette 117 may be dimensioned to accommodate any number of battery packs, as desired.

FIGS. 4a and 4b show exemplary receiver 120 resident inside the host equipment, charging cart assembly, or rack, to receive cassettes with battery packs. Receiver 120 comprises a plurality of bays 122, 124 dimensioned to receive cassettes 126, 128 having battery packs, as described above. As shown in FIG. 4c, associated with receiver 120 is charge/discharge board 127 for each individual battery pack 72a-d. Charge/discharge board 127 comprises a plurality of components, such as an ideal diode and other safety circuitry to facilitate safe parallel interconnection of the individual battery packs 72a-d. Charge/discharge board 127 receives the output voltages of individual packs 72a-d and the thermal sensor data, and charge/discharge board 127 may be communicatively coupled to host power system monitoring board 129 communicatively coupled to the host equipment, charging cart assembly, or rack, for collecting and analyzing information from all cassette discharge boards, and communicating with all external systems and logging data. Charge/discharge board 127 also evaluates the state of battery cassette state, facilitate safe discharge, and provide data and indications to the user and central power system monitoring board 128.

Each of bays 122, 124 comprises opening 130, 132 and cavity 134 defined by opposed side walls 136, 138, partial opposed side walls 140, 142 and bottom wall 144. Projecting from bottom wall 144 are male connectors 146 with metal contacts coupled to circuit board 148 with circuitry 127. Male connectors 146 are received in female connectors 147 of cassette 126 to make electrical contact with metal contacts associated with female connectors 147 when cassette 126 is fully inserted into bay 122.

Looking at FIG. 4b, each of opposed side walls 136, 138 comprises alignment rail 160 which are received by alignment channel 162 on the exterior surfaces of opposed side walls 78a, 78b of storage and transport cassette 126. Alignment rail 160 is slidably received in alignment channel 162 to facilitate insertion and/or removal of storage and transport cassette 126 to/from bay 130, and properly align male connectors 146 with the female connectors 147. Opening 130 is shown in greater detail in FIG. 4b, and opening 130 comprises funnel shaped edges 170 complimentary of bevel shaped edges 172 of end cap assembly 106, which help in guiding cassette 126 into bay 122.

Referring now to FIGS. 4d-f, there are shown various views of receiver or discharge bay assembly 173 for battery pack cassettes 126. Bottom wall 144 also includes a plurality of magnets 150 which attract metal plate 152 of end cap assembly 106 of cassette 126. In addition to a force applied to battery pack cassettes 126 to slide battery pack cassettes 126 along alignment rail 160, magnets 150 exert a magnetic force which pulls and holds the cassettes 126 in place to facilitate alignment between connectors 146 and 147, and subsequent engagement. Magnets 150 are held in place in bottom wall 144 by magnet holder 154, and the depth of magnets 150 within bottom wall 144 can be adjusted to control the magnetic force in relation to metal plate 152. Bays 122, 124 may include magnets 150, resilient members (as described in with reference to FIGS. 7a-7d), or a combination thereof.

FIGS. 5a, 5b and 5c show cassette 126 partially inserted within bay 134 of receiver or discharge bay assembly 173, and FIGS. 6a, 6b and 6c shows cassette 126 fully inserted in cavity 134 of receiver or discharge bay assembly 173 with end cap assembly 106 abutting bottom wall 144. Accordingly, cassette 126 is securely retained within cavity 134 with male connectors 144 mating with the female connectors 147 when cassette 126 is fully inserted in bay 134. Bay 134 may include magnets 150, resilient members (as described in with reference to FIGS. 7a-7d), or a combination thereof.

Figure 6D:
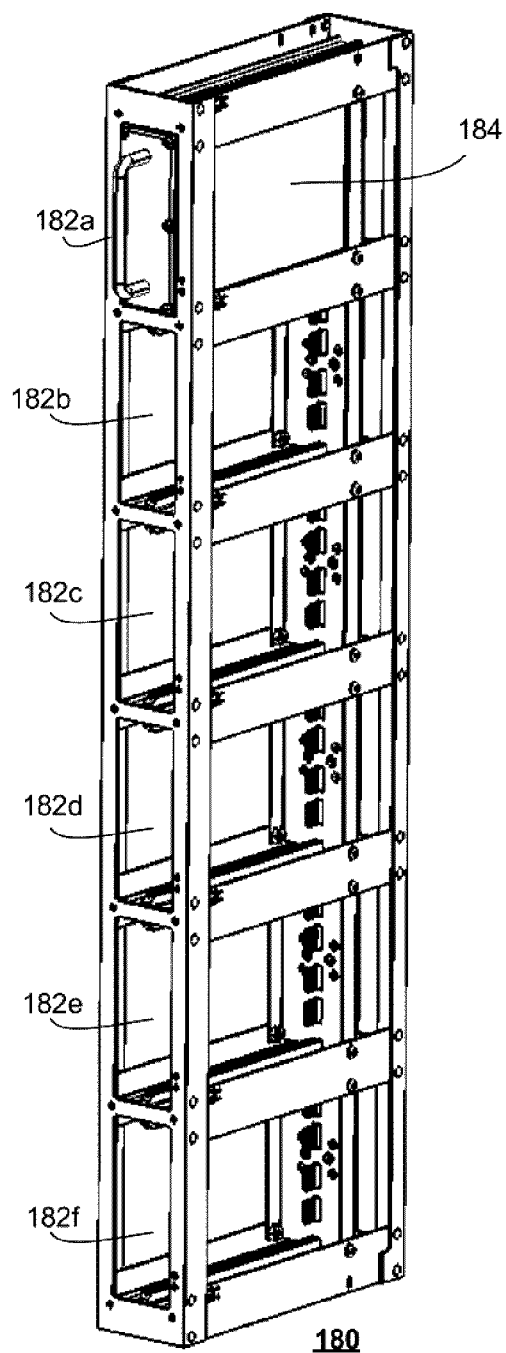
FIG. 6d shows an isometric view of a receiver or discharge bay assembly in another embodiment.

FIG. 6d shows receiver or discharge bay assembly 180 comprising a plurality of bays 182a-f for receiving cassettes 184, in another exemplary implementation. The bays 182a-f may include magnets 150, resilient members (as described in with reference to FIGS. 7a-7d), or a combination thereof.

Looking at FIGS. 7a-7d showing receiver 120, cassettes 126 are vertically dropped into bays 122, 124 of receiver 120. On either side of alignment channel 162 are resilient members 174, such as spring members, with one end 176 secured to side wall 136, portion 178 projecting into cavity 134, and free end portion 180 resting on side wall 136, as shown in 7c and 7d. When cassette 126 is inserted into bay 122, alignment channel 162 engages alignment rail 160 and cassette 126 slides along alignment rail 160, as shown in FIGS. 7a and 7c. Portion 178 protrudes a sufficient distance from side wall 136 to prevent cassette 126 from travelling past protruding portion 178 without the application of any external forces. As cassette 126 travels into cavity 134, the sides of end cap assembly 106 contact portion 178 of spring member 174. A force is applied to cassette 126 to cause portion 178 of spring member 174 to collapse and free end portion 180 glides along side wall 136 towards bottom wall 144, as shown in FIGS. 7b and 7d for electrical connectivity. Cassette 126 is securely retained within cavity 134 when cassette 126 is fully inserted in cavity 134, and male connectors 146 mate with the female connectors 147. Accordingly, spring members 174 provide a drop controlling mechanism for receiver 120.

Figure 8A:
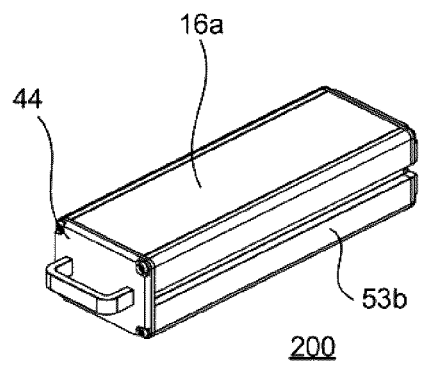
FIG. 8a shows an isometric view of an exemplary battery pack cassette comprising a single hollow body casing.
Figure 8B:
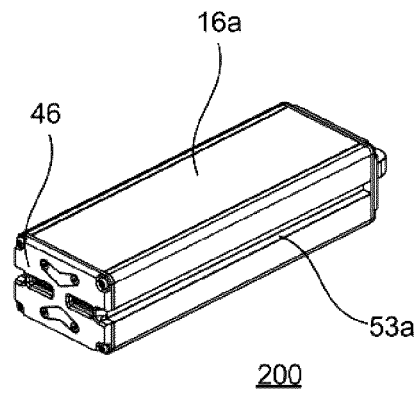
Figure 8C:
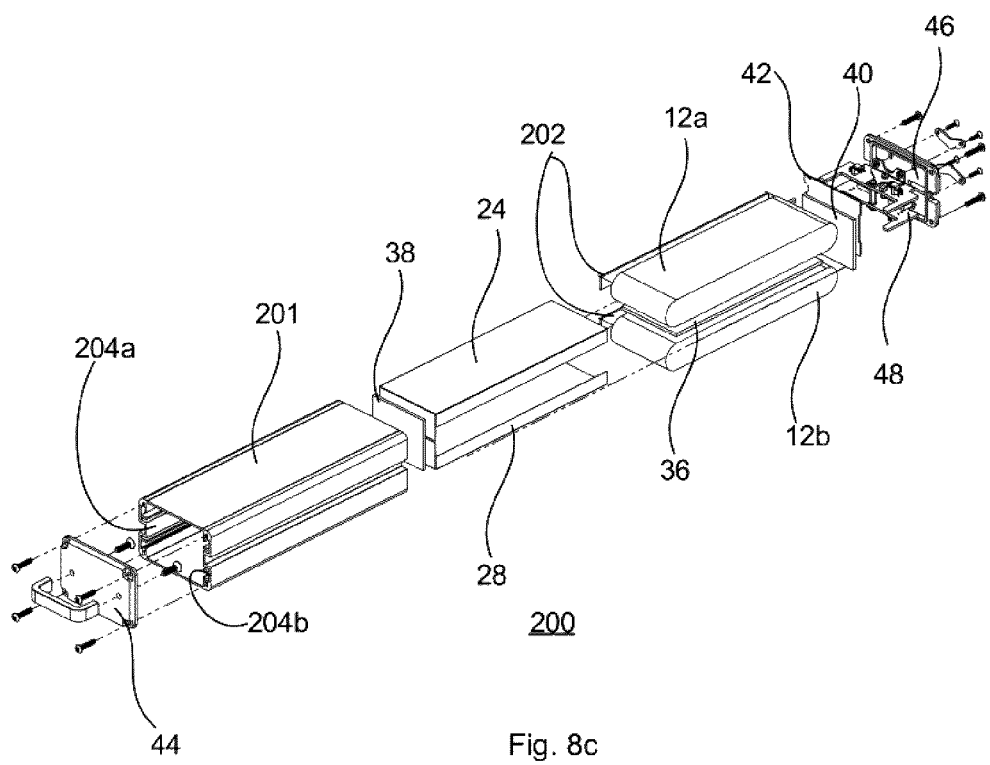

In yet another exemplary implementation, looking at FIGS. 8a-c there is shown cassette 200 formed of a single hollow body casing 201 of extruded material e.g. aluminum, for receiving two battery packs 12a, 12b. Cassette 200 of FIG. 8a-c comprises similar elements to those of FIGS. 1a-e and includes side shock absorbent pads 202 positioned between either sides of battery packs 12a, 12b and interior side walls 204a, 204b of cassette 200.

In yet another exemplary implementation, looking at FIGS. 9a-c there is shown cassette 300 formed of a single hollow body casing 301 of extruded material e.g. aluminum, for receiving 4 battery packs 72a-d. Cassette 300 of FIG. 9a-c comprises similar elements to those of FIGS. 2a-e and includes side shock absorbent pads 302 positioned between either sides of battery packs 72a-d and interior side walls 304a, 304b of cassette 300. In addition, first shock absorbent end-pads 306 are positioned between top cap assembly 104 and linking member 94, and second shock absorbent end-pads 308 are positioned between end cap assembly 106 and divider board 102.

Figures 10A, 10B:
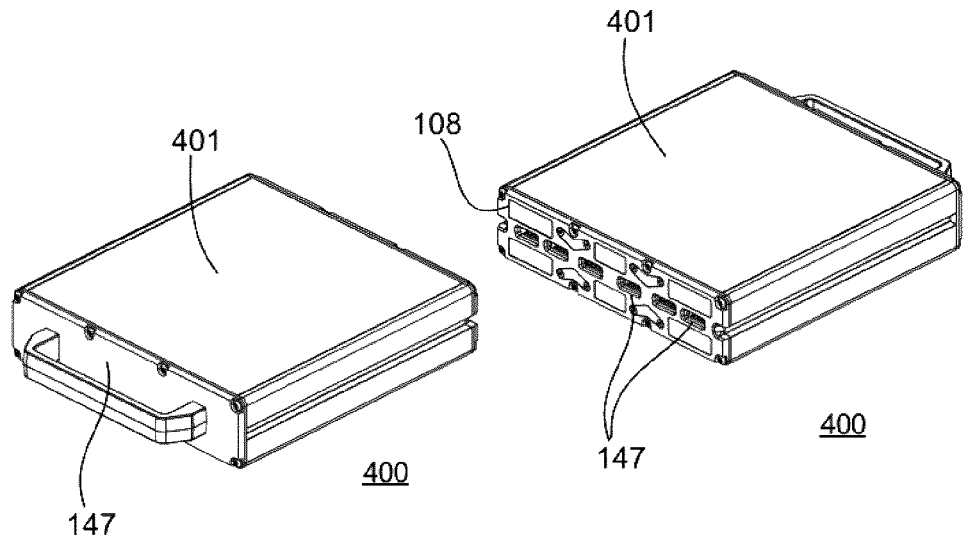
Figure 10C:
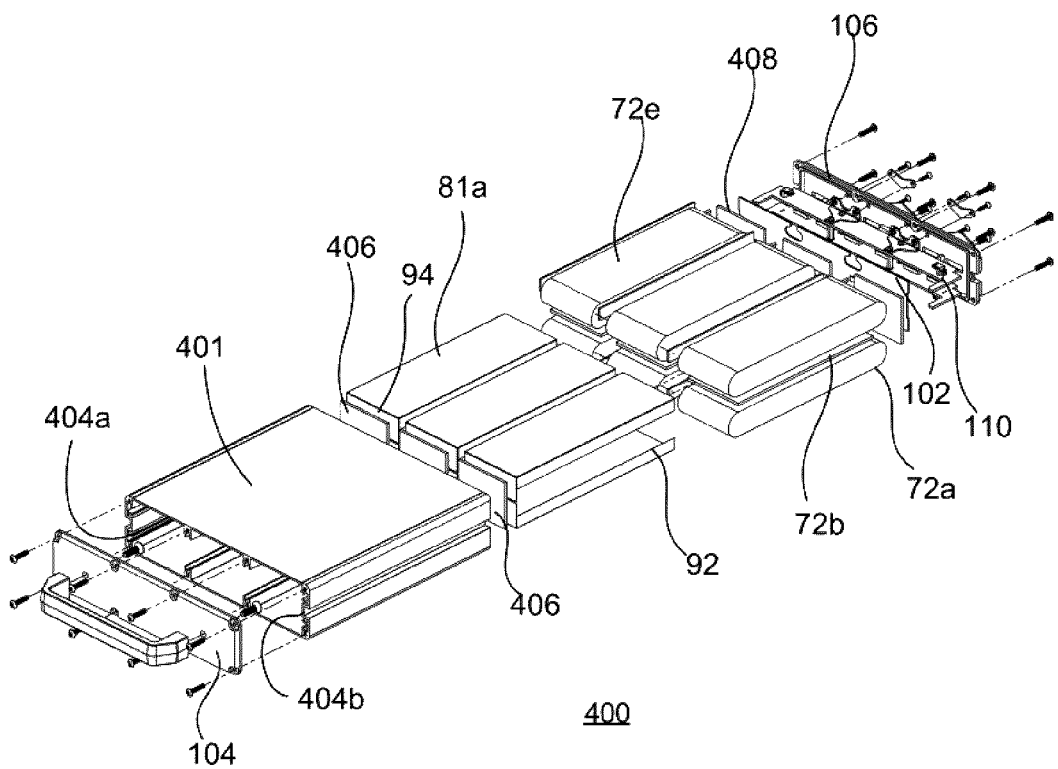
Figures 16A, 16B:
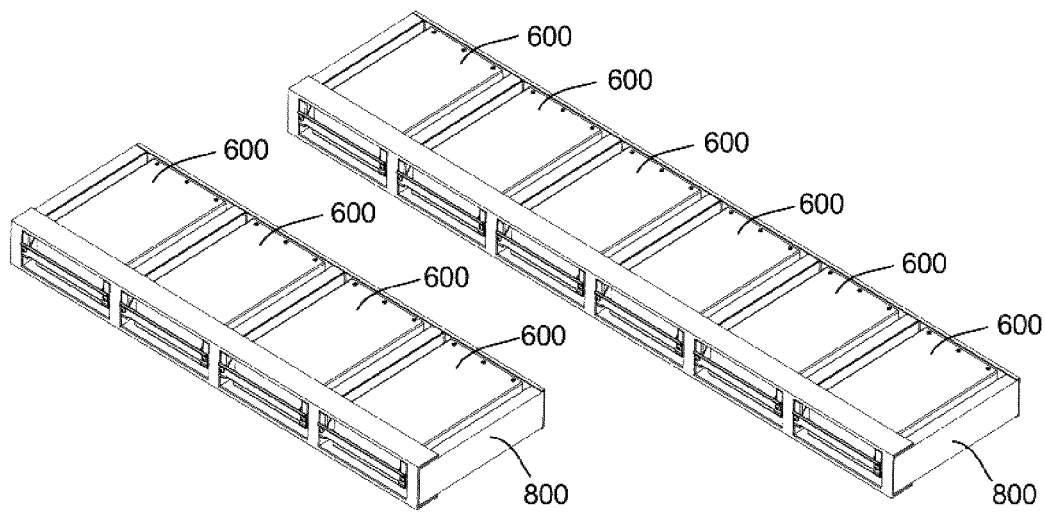
FIGS. 16a and 16b show various configurations of receivers.

In yet another exemplary implementation, looking at FIGS. 10a-c there is shown cassette 400 formed of a single hollow body casing 401 of extruded material e.g. aluminum, for receiving 6 battery packs 72a-f. Cassette 400 of FIG. 10a-c comprises similar elements to those of FIGS. 9a-c and includes side shock absorbent pads 402 positioned between either sides of battery packs 72a-f and interior side walls 404a, 404b of cassette 400. In addition, first shock absorbent end-pads 306 are positioned between top cap assembly 104 and linking member 94, and second shock absorbent end-pads 308 are positioned between end cap assembly 106 and divider board 102.

In yet another exemplary implementation, looking at FIGS. 11a-c there is shown cassette 500 formed of two hollow bodies 501a, 501b made of extruded material e.g. aluminum, for receiving 8 battery packs 72a-h. Cassette 500 of FIG. 11a-c comprises similar elements to those of FIGS.

9a-c and includes side shock absorbent pads 502 positioned between either sides of battery packs 72a-h and interior side walls 504a, 504b of hollow bodies 501a, 501b. In addition, first shock absorbent end-pads 506 are positioned between top cap assembly 104 and linking member 94, and second shock absorbent end-pads 508 are positioned between end cap assembly 106 and divider board 102. Alternatively, cassette 500 may be built as a single-piece construction formed of extruded metal material, such as aluminum.

In another embodiment, internal cassette board 108 comprises a battery management system with a battery monitoring module for monitoring the individual status of each battery pack, such as total voltage, voltages of individual cells, minimum and maximum cell voltage or voltage of periodic taps; temperature; state of charge or depth of discharge to indicate the charge level of the battery; state of health indicative of the remaining capacity of the battery as a percentage of the original capacity and the state of power indicative of the amount of power available for a defined time interval given the current power usage, fuel gauge, temperature and other conditions. Accordingly, the battery monitoring system also controls the battery charge rate. The battery management system includes a communication interface for exchanging information with a receiver board associated with the host equipment, charging cart assembly or rack. This information comprises any one of battery type, model number, manufacturer, characteristics, charge/discharge rate, predicted remaining capacity, an almost-discharged alarm so that the host device can shut down gracefully, and temperature and voltage to provide safe fast-charging. Accordingly, the battery management system allows for self-monitoring, self-diagnosis and self-shutdown, and creates onboard event logs, including statistics pertaining to the cassette or battery packs, such as charge/discharge statistics, among others, including user habits.

Internal cassette board 108 may include output means such as LEDs, which may emit different colors based on the state of the battery packs, and for monitoring the low voltage cutoff signals from DC-DC converters.

In another embodiment, the cassette comprises receptacle connectors configured to receive reversible or dual orientation plug connectors associated with the host equipment, charging cart assembly, or rack, such that the cassette can be plugged in into the load or the charger with no regard to its orientation. Accordingly, the input/output receptacle ports can have a 180-degree symmetrical, double orientation design, which enables the male plug connector to be inserted into a corresponding receptacle connector in either of two intuitive orientations, aided by the cassette guides, that is, alignment rails and alignment channels. FIGS. 11d and 11e show a wiring diagram of the contacts associated with the receptacle connector of a cassette for electrically isolating each of the battery packs. Accordingly, in one orientation the cassette connects to the receiver via a set of contacts A, B, C, and D on a first receptacle surface, and in another orientation the cassette connects to the receiver via a set of contact A', B', C', and D' on a second receptacle surface, such as the cassette can be interchangeably received by the receiver.

In yet another exemplary implementation, looking at FIGS. 12a and 12b there is shown cassette 600 formed of a single hollow body casing 601 of extruded material e.g. aluminum, for receiving 4 battery packs 72a-d. Single hollow body casing 601 comprises a closed end 602a and an open end 602b for receiving battery packs 72a-d, and end cap assembly 603. Cassette 600 of FIGS. 12a and 12b comprises similar elements to those of FIG. 9a-c and includes side shock absorbent pads 604 positioned between either side of battery packs 72a-d and the interior of side walls 605a, 605b of cassette 600. In addition, first shock absorbent end-pads 606 are positioned adjacent to closed end 602a, and second shock absorbent end-pads 608 are positioned between end cap assembly 603 and divider board 610. End cap assembly 603 also houses printed circuit board 612 comprising electronic circuitry 614 with a plurality of electronic elements, including input/output ports 616 for individual electrical coupling of each of battery packs 72a, 72b, 72c, and 72d to electronic circuitry 614. Accordingly, each of battery packs 72a, 72b, 72c, and 72d comprises conductors coupled thereto terminating at a connector 616. Single hollow body casing 601 comprises interior structural rib 617 which provides additional strength to casing 601.

Each of the exterior surfaces of opposed side walls 605a, 605b comprises alignment rail 618a, 618b, respectively, to facilitate insertion and/or removal of storage and transport cassette 600 to/from a bay associated with a receiver of the host equipment, charging cart assembly, or rack. Closed end 602a also includes handle 620 for easy handling, as shown in FIG. 14a. The receiver 800 comprises alignment channels 622a, 622b, and therefore alignment rails 618a, 618b are introduced into alignment channels 622a, 622b, and cassette 600 is caused to travel within the bay until the input/output ports 616 interface with the complementary ports associated with receiver 800.

In yet another exemplary implementation, looking at FIGS. 13a and 13b there is shown cassette 700 formed of a single hollow body casing 701, for receiving ten battery packs 72a, 72b, 72c, 72d, 72e, 72f, 72g, 72h, 72i, and 72j. Single hollow body casing 701 comprises a closed end 702a and an open end 702b for receiving battery packs 72a-i, and end cap assembly 703. Cassette 700 of FIGS. 13a and 13b comprises similar elements to those of FIG. 12a, 12b and includes side shock absorbent pads 704 positioned between either side of battery packs 72a-d and the interior of side walls 705a, 705b of cassette 700. In addition, first shock absorbent end-pads 706 are positioned adjacent to closed end 702a, and second shock absorbent end-pads 708 are positioned between end cap assembly 703 and divider board 710. End cap assembly 703 also houses printed circuit board 712 comprising electronic circuitry 714 with a plurality of electronic elements, including connectors 716 for individual electrical coupling of each of battery packs 72a, 72b, 72c, 72d, 72e, 72f, 72g, 72h, 72i, and 72j to electronic circuitry 714. Accordingly, each of battery packs 72a, 72b, 72c, 72d, 72e, 72f, 72g, 72h, 72i, and 72j comprises conductors coupled thereto terminating at a connector receivable by input/output ports 716. Single hollow body casing 701 comprises interior structural ribs 717 which provides additional strength to casing 701.

Each of the exterior surfaces of opposed side walls 705a, 705b comprises alignment rails 718a, 718b, respectively, to facilitate insertion and/or removal of storage and transport cassette 700 to/from a bay associated with the receiver of equipment in use or a charging cart assembly, or rack. Closed end 702a also includes handle 720 for easy handling. The host equipment or the charging cart assembly comprises alignment channels 822a, 822b (as shown in FIG. 14a), and therefore alignment rails 718a, 718b are introduced into alignment channels 722a, 722b, and cassette 700 is caused to travel within the bay until the input/output ports 716 interface with the complementary ports associated with the equipment in use or a charging cart assembly.

In yet another exemplary implementation, looking at FIG. 14a there is shown cassette 600 and receiver 800. As described above, receiver 800 may be included in a charging cart assembly or load equipment or a rack. Receiver 800 comprises face 801 with opening 802, side walls 804a, 804b and receiver connection board 806, opposite opening 802, with connector 808. Cavity 810 is defined between opening 802, side walls 804a, 804b, and receiver connection board 806. Side walls 804a, 804b, comprises alignment channels 822a, 822b, respectively. Cassette 600 is introduced into receiver 800 via opening 802 by aligning alignment rail 618a, 618b with alignment channels 822a, 822b. A force is applied to closed end 702a to cause cassette 600 to travel within the bay until the input/output ports 616 interface with the complementary ports 808 associated with the equipment in use or a charging cart assembly. Once received within receiver 800, cassette 600 is securely retained with receiver 800 via fastening means, such as screws 824, introduced in handle 720 and received by orifices 826 in face 801.

Various configurations of the receivers are shown in FIGS. 15a, 15b, and 16a, 16b. Now referring to FIG. 17a, there is shown charging cart 900 comprising a plurality of receivers 902 configured for receiving cassettes 904 in a vertical orientation. As stated above, the receivers 902 comprise opposed resilient members disposed on at least two side walls of the bay such that when the cassette 902 is inserted into the cavity the opposed resilient members engage the cassette casing for controlled travel of the cassette 904 until cassette connectors and receiver connectors engage for electrical connectivity.

Figures 17A, 17B, 17C:
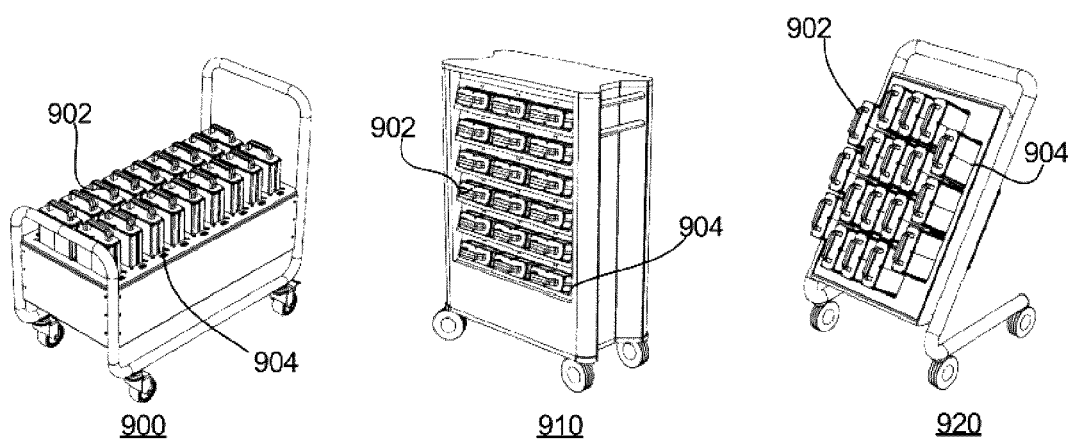
FIG. 17a shows a charging cart assembly with battery pack cassettes inserted vertically.
FIG. 17b shows a charging cart assembly with battery pack cassettes inserted horizontally.
FIG. 17c shows a charging cart assembly with battery pack cassettes inserted diagonally.

FIG. 17b shows charging cart 910 comprising a plurality of receivers configured for receiving cassettes 904, in a horizontal orientation. As stated above, the receivers 902 comprise a plurality of magnets which attract a metal plate on an end cap assembly of the cassettes 902 to facilitate alignment between cassette connectors and receiver connectors.

FIG. 17c shows charging cart 920 comprising a plurality of receivers configured for receiving cassettes 902, in a diagonal orientation. The receivers may include magnets, resilient members, or a combination thereof.

Accordingly, the receivers may include a plurality of magnets which attract a metal plate on an end cap assembly of the cassettes to facilitate alignment between cassette connectors and receiver connectors; opposed resilient members disposed on at least two side walls of the bay of the receiver such that when the cassette is inserted into the cavity the opposed resilient members engage the cassette casing for controlled travel of the cassette until the cassette connectors and the receiver connectors engage for electrical connectivity. As such, the receivers may include magnets, resilient members, or a combination thereof, regardless of the orientation of the receivers within the charging cart assembly, host equipment or rack. As will appreciated, receivers 902 can be configured to receive any dimension of cassette, such as cassette 10, 70, 117, 126, 128, 184, 200, 300, 400, 500, 600 and 700.

In another embodiment, the battery pack comprises any battery cell chemistry.

In yet another embodiment, the cassette comprises plug connectors and the receiver comprises receptacle connectors, and similar to the description above the cassette is reversibly received by the receiver.

Various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A cassette for housing at least one energy storage device, the cassette comprising:
   a hollow longitudinal casing for receiving at least one energy storage device;
   a top cap assembly received at one end of the hollow longitudinal casing and an end cap assembly received at another end of the hollow longitudinal casing;
   electronic circuitry housed within the end cap assembly, the electronic circuitry comprising at least one receptacle associated with each of the at least one energy devices, the at least one receptacle mateable with at least one plug associated with an external device;
   wherein the at least one energy storage device is individually coupled to the electronic circuitry and electrically isolated from other at least one energy storage devices; and wherein the at least one receptacle comprises a first plurality of receptacle metallic contacts and a second plurality of receptacle metallic contacts, such that the cassette is coupled to the external device in a first orientation via the first plurality of receptacle metallic contacts, or in a second orientation via the second plurality of receptacle metallic contacts, such that the cassette is reversibly received in the external device;
   opposed channel rails disposed on the hollow casing;
   wherein the channel rails are received by alignment channels associated with the external device, such that the cassette is urged along the alignment channels until the at least one receptacle engages the at least one plug for electrical connectivity; and
   wherein each of the at least one energy storage devices is rated below a predetermined regulatory rating for safe transportation and complies with at least one regulation pertaining to the transport of dangerous goods, and the cassette housing a plurality of the at least one energy storage devices which are isolated from each other complies with the at least one regulation pertaining to the transport of dangerous goods.

2. The cassette of claim 1, wherein the cassette is received by a bay associated with the external device, wherein the bay comprises an opening, side walls and a bottom wall opposite the opening; and wherein the bottom wall comprises at least one magnet.

3. The cassette of claim 2, wherein the end cap assembly comprises a metal plate which is attracted by the at least one magnet when the cassette is received by the bay, whereby the at least one magnet pulls and holds the cassette in place to facilitate alignment between the at least one receptable and the at least one plug for electrical connectivity.

4. The cassette of claim 3, wherein the at least one magnet is disposed adjacent the bottom wall at a predetermined depth, wherein the predetermined depth is adjustable to control the magnetic force exerted by the at least one magnet on the metal plate.

5. The cassette of claim 2, wherein the bay comprises opposed resilient members disposed on at least two side walls of the bay such that when cassette is inserted into the cavity the opposed resilient members engage the hollow casing for controlled travel of the cassette until the at least one receptable engages the at least one plug for electrical connectivity.

6. The cassette of claim 1, wherein the at least one energy storage device is coupled to the external device in at least one of a horizontal orientation, a vertical orientation and a diagonal orientation.

7. The cassette of claim 1, wherein the electronic circuitry comprises a thermal sensor associated with the at least one energy storage device.

8. The cassette of claim 1, wherein the electronic circuitry comprises a unique identifier stored in at least one memory, wherein the unique identifier is associated with the cassette and the at least one energy storage device.

9. The cassette of claim 1, comprising a battery monitoring system comprising a communication interface for exchanging information with a receiver board associated with the external device, wherein the information comprises any one of battery type, model number, manufacturer, characteristics, charge/discharge rate, predicted remaining capacity, an almost-discharged alarm, temperature and voltage, and commands.

10. The cassette of claim 1, wherein the external device is one of a charging cart assembly, host equipment, and a rack.

11. The cassette of claim 1, further comprising an upper longitudinal protective tray element and an upper longitudinal protective tray element with a lower longitudinal base; whereby each of the upper longitudinal protective tray element and the lower longitudinal protective tray element receive the at least one energy storage device;
- at least one first shock absorbent end-pad abutting one end of the at least one energy storage device and at least one second shock absorbent end-pad abutting another end of the at least energy storage device;
- at least one divider board abutting the at least one second shock absorbent end-pad;
- at least one side shock absorbent pad positioned between at least one side of the least one energy storage device and an interior wall of the hollow casing.

12. The cassette of claim 1, wherein the at least one energy storage device comprises any battery cell chemistry.

13. The cassette of claim 1, wherein the at least one regulation pertaining to the transport of dangerous goods is Class 9 of at least one of United Nations UN3480 and UN3481 assigned by the United Nations Committee of Experts on the Transport of Dangerous Goods.

14. The cassette of claim 13, wherein each of the at least one energy storage devices is less than 100 watt hours (Wh).

15. A method of transporting at least one energy storage device, the method comprising the steps of:
- housing at least one energy storage device in a cassette comprising:
  - a hollow casing for receiving at least one energy storage device;
  - a top cap assembly received at one end of the hollow casing and an end cap assembly received at another end of the hollow casing;
  - electronic circuitry housed within the end cap assembly, the electronic circuitry comprising at least one receptacle associated with each of the at least one energy sources, the at least one receptacle mateable with at least one plug associated with an external device;
  - opposed channel rails disposed on the hollow casing;
- wherein the channel rails are received by alignment channels associated with the external device, such that the cassette is urged along the alignment channels until the at least one receptacle engages the at least one plug for electrical connectivity;
- the at least one receptacle comprising a plurality of receptacle metallic contacts and a plurality of plug metallic contacts, such that the cassette is coupled to the external device in a first orientation via the plurality of receptacle metallic contacts, or in a second orientation via the plurality of plug metallic contacts, such that the cassette is reversibly received in the external device;
- electrically isolating the at least one energy storage device from other at least one energy storage devices by individually coupling the at least one energy storage device to the electronic circuitry;
- wherein the cassette is received by a bay associated with the external device, wherein the bay comprises an opening, side walls and a bottom wall opposite the opening;
- wherein the bottom wall comprises at least one magnet; and
- wherein each of the at least one energy storage devices is rated below a predetermined regulatory rating for safe transportation and complies with at least one regulation pertaining to the transport of dangerous goods, and the cassette housing a plurality of the at least one energy storage devices which are isolated from each other complies with the at least one regulation pertaining to the transport of dangerous goods.

16. The method of claim 15, wherein the bay comprises opposed resilient members disposed on at least two side walls of the bay such that when cassette is inserted into the cavity the opposed resilient members engage the hollow casing for controlled travel of the cassette until the at least one receptable engages the at least one plug for electrical connectivity.

17. The method of claim 16, wherein the at least one energy storage device is coupled to the external device in at least one of a horizontal orientation, a vertical orientation and a diagonal orientation.

* * * * *